United States Patent
Kanai et al.

(10) Patent No.: US 11,722,511 B2
(45) Date of Patent: Aug. 8, 2023

(54) INFORMATION PROCESSING DEVICE AND NON-TRANSITORY COMPUTER READABLE STORAGE MEDIUM

(71) Applicant: Kabushiki Kaisha Toshiba, Tokyo (JP)

(72) Inventors: Jun Kanai, Inagi (JP); Yurie Shinke, Kawasaki (JP); Hideyuki Miyake, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 67 days.

(21) Appl. No.: 17/079,682

(22) Filed: Oct. 26, 2020

(65) Prior Publication Data
US 2021/0288989 A1   Sep. 16, 2021

(30) Foreign Application Priority Data
Mar. 10, 2020   (JP) .................................. 2020-040589

(51) Int. Cl.
*H04L 9/00*   (2022.01)
*H04L 9/40*   (2022.01)

(52) U.S. Cl.
CPC ...... *H04L 63/1433* (2013.01); *H04L 63/1416* (2013.01)

(58) Field of Classification Search
CPC ........................ H04L 63/1433; H04L 63/1416
USPC ......................................................... 726/23
See application file for complete search history.

(56) References Cited

U.S. PATENT DOCUMENTS

| | | | | |
|---|---|---|---|---|
| 10,594,722 | B2* | 3/2020 | Boggs | H04L 63/1433 |
| 2008/0249817 | A1* | 10/2008 | Nauck | G06F 11/3452 |
| | | | | 714/E11.2 |
| 2010/0154027 | A1* | 6/2010 | Sobel | G06F 21/125 |
| | | | | 726/1 |
| 2016/0057179 | A1* | 2/2016 | Volach | H04M 3/42068 |
| | | | | 370/261 |

(Continued)

FOREIGN PATENT DOCUMENTS

| | | |
|---|---|---|
| JP | 2015-130152 A | 7/2015 |
| JP | 6324646 B1 | 5/2018 |

(Continued)

*Primary Examiner* — Christopher J Brown
(74) *Attorney, Agent, or Firm* — Oblon, McClelland, Maier & Neustadt, L.L.P.

(57) ABSTRACT

According to one embodiment, an information processing device ranks one or more security measures technologies to be ranked. The information processing device includes processing circuitry configured to operate as an influence information obtaining unit, a requirements information obtaining unit and a ranking unit. The influence information obtaining unit obtains influence information indicating correspondence between the one or more security measures technologies and an influence on a system when each of the one or more security measures technologies is introduced into the system. The requirements information obtaining unit obtains requirements information indicating system requirements of the system. The ranking unit ranks the one or more security measures technologies based on a degree of satisfaction of the system requirements indicated in the requirements information, using the requirements information and the influence information.

20 Claims, 26 Drawing Sheets

(56) References Cited

U.S. PATENT DOCUMENTS

| | | | | |
|---|---|---|---|---|
| 2016/0065594 A1* | 3/2016 | Srivastava | .......... | H04L 63/1433 |
| | | | | 726/23 |
| 2016/0378648 A1* | 12/2016 | Ekambaram | .......... | G06F 11/302 |
| | | | | 714/38.1 |
| 2017/0185253 A1* | 6/2017 | Vaglio | .................... | G06F 3/0481 |
| 2022/0012099 A1* | 1/2022 | Hong | .................... | G06F 9/5055 |

FOREIGN PATENT DOCUMENTS

| | | |
|---|---|---|
| JP | 2018-180595 A | 11/2018 |
| JP | 6677623 B2 | 4/2020 |

* cited by examiner

| THREAT | SECURITY MEASURES TECHNOLOGY | SECURITY FUNCTIONS |
|---|---|---|
| INTRUSION OVER NETWORK | IDS | DETECTION |
|  | IPS | PREVENTION |
|  | HOST-BASED FW | PREVENTION |
| MALWARE INFECTION | ANTIVIRUS SOFTWARE | PREVENTION |
|  | HOST-BASED FW | PREVENTION |
| TAMPERING | BACKUP AND RECOVERY | RECOVERY |

FIG. 4

| SECURITY MEASURES TECHNOLOGY | INFLUENCE ON SYSTEM | | |
|---|---|---|---|
| | INCREASE IN COMMUNICATION DELAY | INHIBITION OF NORMAL OPERATION BY OVER-DETECTION | INCREASE IN COMPUTER LOAD |
| IDS | NO INFLUENCE | NO INFLUENCE | NO INFLUENCE |
| IPS | INFLUENCED | INFLUENCED | NO INFLUENCE |
| HOST-BASED FW | INFLUENCED | INFLUENCED | INFLUENCED |
| ANTIVIRUS SOFTWARE | NO INFLUENCE | INFLUENCED | INFLUENCED |

FIG. 5

| CLASSIFICATION | REQUIREMENTS ITEM | REQUIREMENTS CONTENT |
|---|---|---|
| SECURITY REQUIREMENTS | SECURITY FUNCTIONS | PREVENTION |
| SYSTEM REQUIREMENTS | INCREASE IN COMMUNICATION DELAY | ACCEPTABLE |
| SYSTEM REQUIREMENTS | INHIBITION OF NORMAL OPERATION BY OVER-DETECTION | UNACCEPTABLE |
| SYSTEM REQUIREMENTS | INCREASE IN COMPUTER LOAD | UNACCEPTABLE |

FIG. 6

| THREAT 1 | INTRUSION OVER NETWORK |
|---|---|
| THREAT 2 | MALWARE INFECTION |

FIG. 7

| SECURITY MEASURES TECHNOLOGY | THE NUMBER OF UNSATISFIED SECURITY REQUIREMENTS (A) | THE NUMBER OF UNSATISFIED SYSTEM REQUIREMENTS (B) | SCORE $(A \times (-1) + B \times (-1/3))$ | RANK |
|---|---|---|---|---|
| IDS | 1 | 0 | −1 | THE THIRD PLACE |
| IPS | 0 | 1 | −0.33 | THE FIRST PLACE (TECHNOLOGY TO BE RECOMMENDED) |
| HOST-BASED FW | 0 | 2 | −0.66 | THE SECOND PLACE |

FIG. 8

| SECURITY MEASURES TECHNOLOGY | THE NUMBER OF UNSATISFIED SECURITY REQUIREMENTS (A) | THE NUMBER OF UNSATISFIED SYSTEM REQUIREMENTS (B) | SCORE $(A \times (-1) + B \times (-1/3))$ | RANK |
|---|---|---|---|---|
| HOST-BASED FW | 0 | 2 | -0.66 | THE FIRST PLACE (TECHNOLOGY TO BE RECOMMENDED) |
| ANTIVIRUS SOFTWARE | 0 | 2 | -0.66 | THE FIRST PLACE (TECHNOLOGY TO BE RECOMMENDED) |

FIG. 9

| THREAT ITEM | THE FIRST PLACE (TECHNOLOGY TO BE RECOMMENDED) | THE SECOND PLACE | THE THIRD PLACE |
|---|---|---|---|
| THREAT 1: INTRUSION OVER NETWORK | IPS (-0.33) | HOST-BASED FW (-0.66) | IDS (-1.0) |
| THREAT 2: MALWARE INFECTION | HOST-BASED FW (-0.66) ANTIVIRUS SOFTWARE (-0.66) | | |

FIG. 10

| THREAT | THE FIRST PLACE (TECHNOLOGY TO BE RECOMMENDED) | THE SECOND PLACE | THE THIRD PLACE |
|---|---|---|---|
| THREAT 1: INTRUSION OVER NETWORK | HOST-BASED FW (-0.16) | IPS (-0.33) | IDS (-1.0) |
| THREAT 2: MALWARE INFECTION | HOST-BASED FW (-0.16) | ANTIVIRUS SOFTWARE (-0.66) | |

FIG. 11

| SECURITY MEASURES TECHNOLOGY | INFLUENCE ON SYSTEM | | |
|---|---|---|---|
| | INCREASE IN COMMUNICATION DELAY | INHIBITION OF NORMAL OPERATION BY OVER-DETECTION | INCREASE IN COMPUTER LOAD |
| IDS | NO INFLUENCE | NO INFLUENCE | NO INFLUENCE |
| IPS | SMALL INFLUENCE | SMALL INFLUENCE | NO INFLUENCE |
| HOST-BASED FW | MEDIUM INFLUENCE | LARGE INFLUENCE | MEDIUM INFLUENCE |
| ANTIVIRUS SOFTWARE | NO INFLUENCE | SMALL INFLUENCE | SMALL INFLUENCE |

FIG. 12

| CLASSIFICATION | REQUIREMENTS ITEM | REQUIREMENTS CONTENT |
|---|---|---|
| SECURITY REQUIREMENTS | SECURITY FUNCTIONS | PREVENTION |
| SYSTEM REQUIREMENTS | INCREASE IN COMMUNICATION DELAY | NO DEMAND (NO CONSTRAINT) |
| SYSTEM REQUIREMENTS | INHIBITION OF NORMAL OPERATION BY OVER-DETECTION | MEDIUM DEMAND (MEDIUM CONSTRAINT) |
| SYSTEM REQUIREMENTS | INCREASE IN COMPUTER LOAD | LARGE DEMAND (LARGE CONSTRAINT) |

FIG. 13

|  | LARGE DEMAND (LARGE CONSTRAINT) | MEDIUM DEMAND (MEDIUM CONSTRAINT) | SMALL DEMAND (SMALL CONSTRAINT) | NO DEMAND (NO CONSTRAINT) |
|---|---|---|---|---|
| INFLUENCE OF SECURITY MEASURES TECHNOLOGY ON SYSTEM IS "LARGE" | −1 | −0.8 | −0.4 | 0 |
| INFLUENCE OF SECURITY MEASURES TECHNOLOGY ON SYSTEM IS "MEDIUM" | −0.8 | −0.6 | −0.2 | 0 |
| INFLUENCE OF SECURITY MEASURES TECHNOLOGY ON SYSTEM IS "SMALL" | −0.4 | −0.2 | −0.1 | 0 |
| "NO" INFLUENCE OF SECURITY MEASURES TECHNOLOGY ON SYSTEM | 0 | 0 | 0 | 0 |

FIG. 14

| SECURITY MEASURES TECHNOLOGY | THE NUMBER OF UNSATISFIED SECURITY REQUIREMENTS (A) | SUITABILITY Ek | SCORE (A × (−1/C) + (ΣEk/D)) | RANK |
|---|---|---|---|---|
| IDS | 1 | E1 = 0<br>E2 = 0<br>E3 = 0 | −1 | THE THIRD PLACE |
| IPS | 0 | E1 = 0<br>E2 = −0.2<br>E3 = 0 | −0.066 | THE FIRST PLACE (TECHNOLOGY TO BE RECOMMENDED) |
| HOST-BASED FW | 0 | E1 = 0<br>E2 = −0.8<br>E3 = −0.8 | −0.53 | THE SECOND PLACE |

FIG. 15

| SECURITY MEASURES TECHNOLOGY | THE NUMBER OF UNSATISFIED SECURITY REQUIREMENTS (A) | SUITABILITY Ek | SCORE $(A \times (-1/C) + (\sum Ek/D))$ | RANK |
|---|---|---|---|---|
| HOST-BASED FW | 0 | $E1 = 0$<br>$E2 = -0.8$<br>$E3 = -0.8$ | $-0.53$ | THE SECOND PLACE |
| ANTIVIRUS SOFTWARE | 0 | $E1 = 0$<br>$E2 = -0.2$<br>$E3 = -0.4$ | $-0.2$ | THE FIRST PLACE (TECHNOLOGY TO BE RECOMMENDED) |

FIG. 16

| THREAT | THE FIRST PLACE (TECHNOLOGY TO BE RECOMMENDED) | THE SECOND PLACE | THE THIRD PLACE |
|---|---|---|---|
| THREAT 1: INTRUSION OVER NETWORK | IPS (0) | HOST-BASED FW (-0.66) | IDS (-1.0) |
| THREAT 2: MALWARE INFECTION | ANTIVIRUS SOFTWARE (-0.33) | HOST-BASED FW (-0.66) | |

FIG. 17

| THREAT | THE FIRST PLACE (TECHNOLOGY TO BE RECOMMENDED) | THE SECOND PLACE | THE THIRD PLACE |
|---|---|---|---|
| THREAT 1: INTRUSION OVER NETWORK | IPS (0) | HOST-BASED FW (-0.16) | IDS (-1.0) |
| THREAT 2: MALWARE INFECTION | HOST-BASED FW (-0.16) | ANTIVIRUS SOFTWARE (-0.33) | |

FIG. 18

| CLASSIFICATION | REQUIREMENTS ITEM | REQUIREMENTS CONTENT |
|---|---|---|
| SECURITY REQUIREMENTS | SECURITY FUNCTIONS | [AUTOMATIC DETERMINATION] |
| SYSTEM REQUIREMENTS | INCREASE IN COMMUNICATION DELAY | [AUTOMATIC DETERMINATION] |
| SYSTEM REQUIREMENTS | INHIBITION OF NORMAL OPERATION BY OVER-DETECTION | UNACCEPTABLE |
| SYSTEM REQUIREMENTS | INCREASE IN COMPUTER LOAD | [AUTOMATIC DETERMINATION] |

FIG. 20

| THREAT | SECURITY MEASURES TECHNOLOGY | SECURITY FUNCTIONS | REMAINING THREAT |
|---|---|---|---|
| INTRUSION OVER NETWORK | IDS | DETECTION | |
| | IPS | PREVENTION | |
| | HOST-BASED FW | PREVENTION | TAMPERING WITH SETTINGS |
| MALWARE INFECTION | HOST-BASED FW | PREVENTION | MALWARE INFECTION VIA EXTERNAL MEDIA, TAMPERING WITH SETTINGS |
| | ANTIVIRUS SOFTWARE | PREVENTION | TAMPERING WITH SETTINGS |
| MALWARE INFECTION VIA EXTERNAL MEDIA | EXTERNAL MEDIA CONNECTION PROHIBITED | PREVENTION | TAMPERING WITH SETTINGS |
| | ANTIVIRUS SOFTWARE | PREVENTION | TAMPERING WITH SETTINGS |
| TAMPERING WITH SETTINGS | ADMINISTRATIVE RIGHTS DISABLED | PREVENTION | |

FIG. 24

| SECURITY MEASURES TECHNOLOGY | INFLUENCE ON SYSTEM | | |
|---|---|---|---|
| | INCREASE IN COMMUNICATION DELAY | INHIBITION OF NORMAL OPERATION BY OVER-DETECTION | INCREASE IN COMPUTER LOAD |
| IDS | NO INFLUENCE | NO INFLUENCE | NO INFLUENCE |
| IPS | INFLUENCED | INFLUENCED | NO INFLUENCE |
| HOST-BASED FW | INFLUENCED | INFLUENCED | INFLUENCED |
| ANTIVIRUS SOFTWARE | NO INFLUENCE | INFLUENCED | INFLUENCED |
| ADMINISTRATIVE RIGHTS DISABLED | NO INFLUENCE | NO INFLUENCE | NO INFLUENCE |
| EXTERNAL MEDIA CONNECTION PROHIBITED | NO INFLUENCE | NO INFLUENCE | NO INFLUENCE |

FIG. 25

| COMBINATION OF SECURITY MEASURES TECHNOLOGIES | THE NUMBER OF UNSATISFIED SECURITY REQUIREMENTS (A) | THE NUMBER OF UNSATISFIED SYSTEM REQUIREMENTS (B) | SCORE $(A \times (-1/C) + B \times (-1/D))$ | RANK |
|---|---|---|---|---|
| COMBINATION 1 "HOST-BASED FW, EXTERNAL MEDIA CONNECTION PROHIBITED, ADMINISTRATIVE RIGHTS DISABLED" | 0 | 2 | -0.22 | THE FIRST PLACE (TECHNOLOGY TO BE RECOMMENDED) |
| COMBINATION 2 "HOST-BASED FW, ANTIVIRUS SOFTWARE, ADMINISTRATIVE RIGHTS DISABLED" | 0 | 4 | -0.44 | THE THIRD PLACE |
| COMBINATION 3 "ANTIVIRUS SOFTWARE, ADMINISTRATIVE RIGHTS DISABLED" | 0 | 2 | -0.33 | THE SECOND PLACE |

FIG. 26

INFORMATION PROCESSING DEVICE AND NON-TRANSITORY COMPUTER READABLE STORAGE MEDIUM

CROSS-REFERENCE TO RELATED APPLICATION

This application is based upon and claims the benefit of priority from Japanese Patent Application No. 2020-040589, filed on Mar. 10, 2020; the entire contents of which are incorporated herein by reference.

FIELD

Embodiments of the present invention relate to an information processing device and a non-transitory computer readable storage medium.

BACKGROUND

In recent years, cyber attacks targeting systems such as control systems or information systems have become common, and security measures are urgently needed. However, since such systems in recent years have various system configurations including a plurality of devices, it takes a considerable development time and cost to incorporate security measures most appropriate for each system. For the purpose of shortening the development period for security measures and reducing the cost, a technology for automatically presenting cost-effective security measures has been proposed.

Requirements that must be met to operate a system are called system requirements. As the system requirements, for example, "increase in communication delay" in a real-time system is not acceptable in many cases. Further, system requirements may be quite different depending on a target system. Accordingly, designing security measures is required with system requirements of the target system taken into consideration.

BRIEF DESCRIPTION OF THE DRAWINGS

FIG. 4 is a diagram showing an example of threat measures information.

FIG. 5 is a diagram showing an example of influence information.

FIG. 6 is a diagram showing an example of requirements information.

FIG. 7 is a diagram showing an example of a threat list.

FIG. 8 is an explanatory diagram of a primary ranking of a threat 1 by a primary ranking unit.

FIG. 9 is an explanatory diagram of a primary ranking of a threat 2 by the primary ranking unit.

FIG. 10 is a diagram showing an example of a measures technology set for the threat 1 and the threat 2.

FIG. 11 is a diagram showing an example of a measures technology set for the threat 1 and the threat 2 after a final ranking.

FIG. 12 is a diagram showing an example of a case where influence information is shown in a multi-step manner.

FIG. 13 is a diagram showing an example of a case where system requirements are shown in a multi-step manner in requirements information.

FIG. 14 is a diagram showing an example of suitability information.

FIG. 15 is an explanatory diagram of a primary ranking of the threat 1 by the primary ranking unit.

FIG. 16 is an explanatory diagram of a primary ranking of the threat 2 by a primary ranking unit.

FIG. 17 is a diagram showing an example of a measures technology set for the threat 1 and the threat 2.

FIG. 18 is a diagram showing an example of a measures technology set for the threat 1 and the threat 2 after a final ranking.

FIG. 20 is a diagram showing an example of requirements information.

FIG. 24 is a diagram showing an example of threat measures information.

FIG. 25 is a diagram showing an example of influence information.

FIG. 26 is an explanatory diagram of a primary ranking of a threat 2 by a primary ranking unit.

DETAILED DESCRIPTION

According to one embodiment, an information processing device ranks one or more security measures technologies to be ranked. The information processing device includes processing circuitry configured to operate as an influence information obtaining unit, a requirements information obtaining unit and a ranking unit. The influence information obtaining unit obtains influence information indicating correspondence between the one or more security measures technologies and an influence on a system when each of the one or more security measures technologies is introduced into the system. The requirements information obtaining unit obtains requirements information indicating system requirements of the system. The ranking unit ranks the one or more security measures technologies based on a degree of satisfaction of the system requirements indicated in the requirements information, using the requirements information and the influence information.

First Embodiment

[Description of Outline of First Embodiment]

Figure 1:
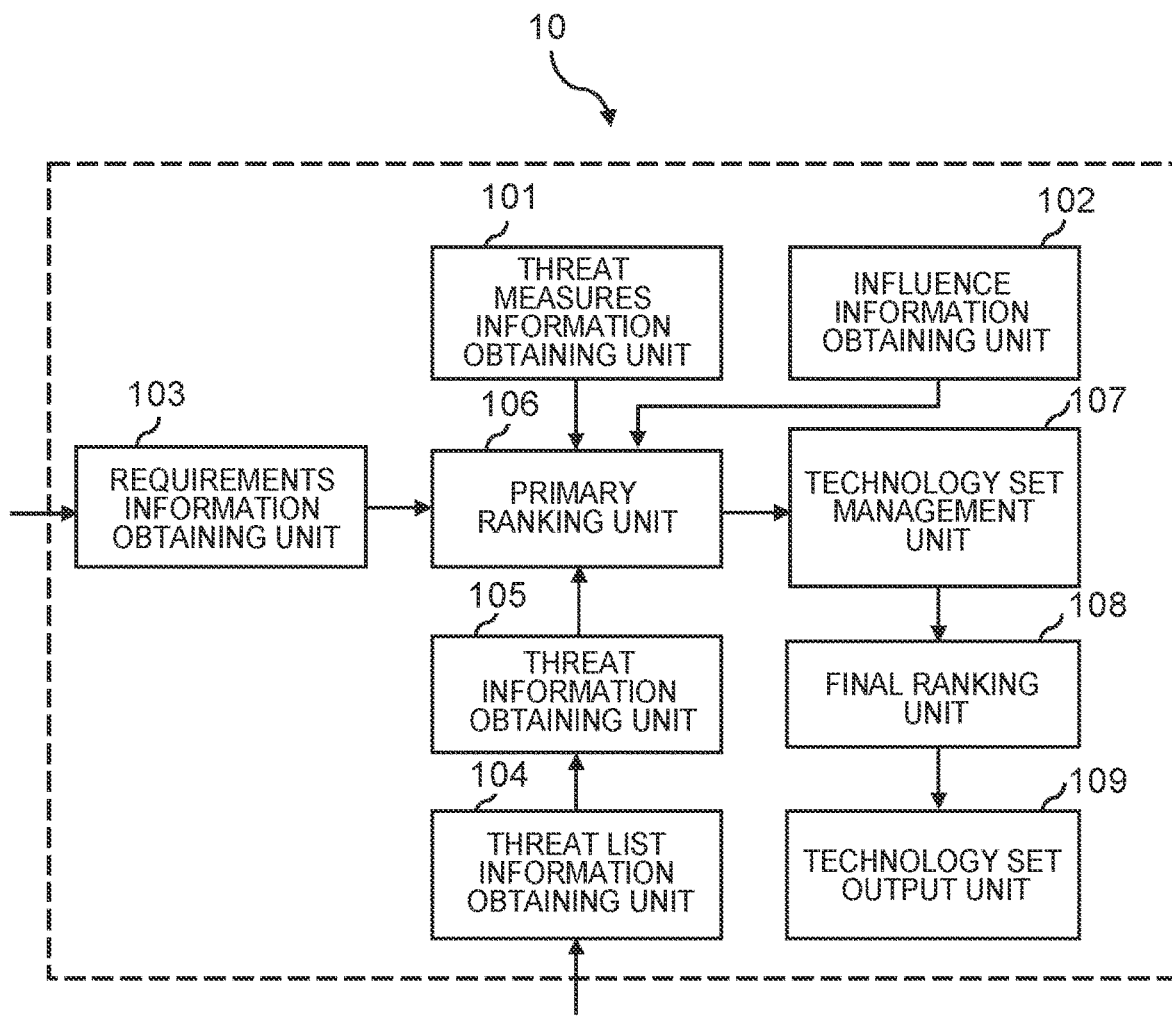
FIG. 1 is a functional block diagram showing an example of the functional configuration of an information processing device according to a first embodiment.

FIG. 1 is a functional block diagram showing an example of the functional configuration of an information processing device 10 according to the first embodiment. The information processing device 10 supports a user in designing the security. Specifically, the information processing device 10 ranks a plurality of security measures technologies effective (manageable) against a threat in a system for which security measures are designed, and presents the result to a user. The user recognizes security measures technologies which produce significant effects of introduction and selects a security measures technology from the security measures technologies, which facilitates the security design.

In the present specification, the security measures technology is sometimes referred to as a measures technology simply. Further, in the present specification, a system into which the security measures are introduced is sometimes referred to as a target system simply.

The information processing device 10 is capable of ranking security measures technologies effective against a threat to the target system on the basis of at least system requirements of the target system and presenting the security measures technologies in descending order of effects of introduction.

As an example, the following describes a case where a security measures technology to be recommended is presented on the basis of security requirements and system requirements for the target system.

In the present specification, the security requirements are conditions for security characteristics of a security measures technology to be introduced into the target system. For example, functions (avoidance, prevention, detection, and recovery) of the security measures technology are examples of the security characteristics of the security measures technology.

Further, in the present specification, the system requirements are conditions that the system must meet in operation of the system. The system requirements are non-functional requirements of the target system except for the security requirements.

For example, "increase in communication delay" in a real-time system is not often acceptable. In such a case, a condition that "increase in communication delay" is not acceptable can be the system requirements. Note that, in the present specification, security requirements information indicating the security requirements and system requirements information indicating the system requirements are collectively referred to as requirements information in some cases.

As shown in FIG. 1, the information processing device 10 includes processing circuitry configured to operate as a threat measures information obtaining unit 101, processing circuitry configured to operate as an influence information obtaining unit 102, processing circuitry configured to operate as a requirements information obtaining unit 103, processing circuitry configured to operate as a threat list information obtaining unit 104, processing circuitry configured to operate as a threat information obtaining unit 105, processing circuitry configured to operate as a primary ranking unit 106, processing circuitry configured to operate as a technology set management unit 107, processing circuitry configured to operate as a final ranking unit 108, and processing circuitry configured to operate as a technology set output unit 109.

The threat measures information obtaining unit 101 has a function to obtain, from an auxiliary storage unit 15 described later, information indicating correspondence between a threat and a security measures technology effective against the threat (such information being hereinafter called threat measures information in some cases), and to manage the obtained information in tabular form as shown in FIG. 4, for example. The threat measures information is information indicating a security measures technology effective against a threat.

In the present embodiment, the threat measures information further includes information indicating correspondence between a security measures technology and security characteristics of the security measures technology (information indicating the security characteristics of the security measures technology). In a case where the information processing device 10 ranks security measures technologies in light of the security requirements, it is necessary that the threat measures information has information indicating the security characteristics of each of the security measures technologies.

Here, the threat measures information includes information described in a catalog of general-purpose security measures technologies and a database of security measures technologies.

The influence information obtaining unit 102 has a function to obtain, from the auxiliary storage unit 15 described later, information indicating correspondence between a security measures technology and "influence on system" occurring in the introduction of the security measures technology into the target system (such information being hereinafter called influence information simply), and to manage the obtained information in tabular form as shown in FIG. 5, for example. The influence information is the "influence on system" occurring in the introduction of the security measures technology into the system.

Here, the "influence on system" refers to an influence of hindering anticipated functions of the target system in operation of the target system. Examples of the "influence on system" include the "increase in communication delay". The influence information is information described in a catalog of a general-purpose security measures technology and a database of a security measures technology, and so on.

The requirements information obtaining unit 103 obtains, through an input of the user, requirements information for the security design of the target system, and manages the obtained information in tabular form as shown in FIG. 6, for example.

The threat list information obtaining unit 104 has a function to obtain, through an input of the user, information indicating a threat list in the target system (sometimes referred to as threat list information) and to manage the obtained information in tabular form as shown in FIG. 7, for example.

The threat information obtaining unit 105 obtains information indicating one threat (sometimes referred to as threat information) from threats included in the threat list information managed by the threat list information obtaining unit 104, and sends the obtained information to the primary ranking unit 106.

The primary ranking unit 106 uses, as security measures technologies to be ranked, security measures technology effective (manageable) against the threat shown in the threat information obtained from the threat information obtaining unit 105. The primary ranking unit 106 ranks the security measures technologies to be ranked in light of at least the system requirements of the security requirements and the system requirements.

In the present specification, a result of ranking of the security measures technologies by the primary ranking unit 106 is sometimes referred to as a primary ranking. The primary ranking unit 106 can rank the security measures technologies on the basis of at least the system requirements information and the influence information of the target system. Further, the number of security measures technologies to be ranked may be one. In a case where the number of security measures technologies to be ranked is one, this security measures technology takes the first place.

Further, the primary ranking unit 106 sends, to the technology set management unit 107, information (sometimes referred to as measures technology set information or technology set information) indicating correspondence (sometimes referred to as a measures technology set or a technology set) between a threat and a result of ranking of security measures technologies against the threat. In the present specification, the primary ranking unit 106 may be referred to as a ranking unit 106.

The technology set management unit 107 manages one or more measures technology sets. To be specific, the technology set management unit 107 has a function to manage information (a plurality of pieces of measures technology set information) indicating correspondence between each threat in the target system and a result of a ranking of security measures technologies effective against each threat (obtained from the primary ranking unit 106). The measures technology set information may include information indicating a score used for the ranking.

In a case where the number of threats in the target system is only one (one threat shown in the threat list information), the primary ranking of the security measures technology effective against the threat is used as a final ranking, and the technology set management unit 107 provides the technology set output unit 109 with the measures technology set information.

In a case where the number of threats in the target system is plural (a plurality of threats shown in the threat list information), the primary ranking unit 106 ranks security measures technologies effective against each threat included in the threat list information in the target system.

Specifically, security measures technologies effective against a first threat included in the threat list information are ranked, and in response to transmission of the measures technology set information to the technology set management unit 107, the threat information obtaining unit 105 obtains threat information indicating a second threat from the threat list information and sends the obtained information to the primary ranking unit 106.

The primary ranking unit 106 ranks security measures technologies effective against the second threat in the foregoing manner. The foregoing processing is performed on all the threats of the threat list. When measures technology sets are prepared for all the threats, the technology set management unit 107 provides the final ranking unit 108 with measures technology set information. In a case where the threat list has only one threat, the technology set management unit 107 sends the measures technology set information to the technology set output unit 109.

Considering deployment cost of the security measures technology, it is preferable that the number of security measures technologies to be introduced into the target system is as small as possible. For this reason, the final ranking unit (sometimes referred to as a re-evaluation unit) 108 performs a final ranking of the security measures technologies in such a manner that a security measures technology effective against a plurality of threats is given a high rank.

The final ranking unit 108 sends the measures technology set information corrected by the final ranking to the technology set output unit 109. The technology set output unit 109 outputs the measures technology set information.

[Description of Hardware Configuration]

Figure 2:
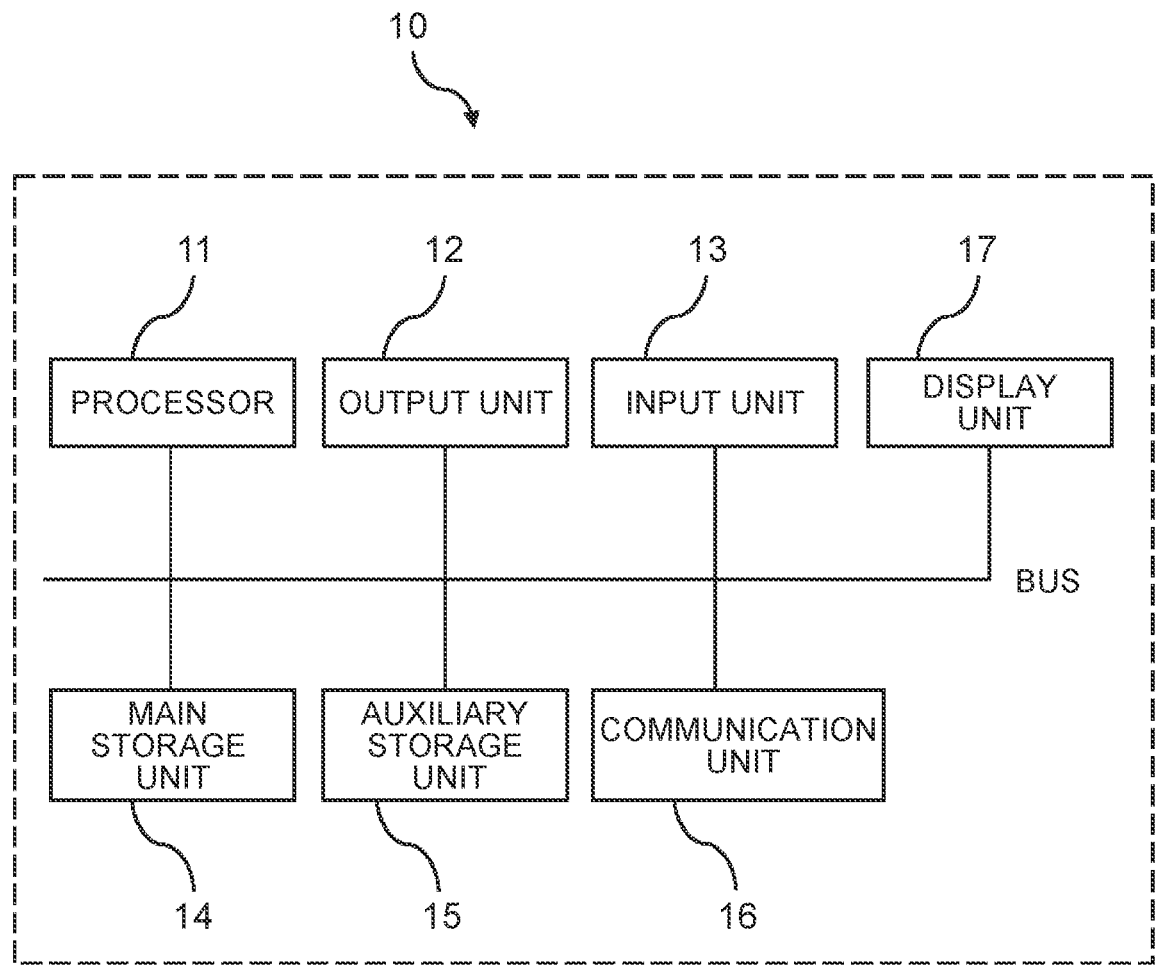
FIG. 2 is a diagram showing an example of the hardware configuration of an information processing device according to the first embodiment.

FIG. 2 is a block diagram showing an example of the hardware configuration of the information processing device according to the first embodiment. The information processing device 10 is a computer, for example. The information processing device 10 includes, as the hardware configuration, a processor 11, an output unit 12, an input unit 13, a main storage unit 14, an auxiliary storage unit 15, a communication unit 16, and a display unit 17. The processor 11, the output unit 12, the input unit 13, the main storage unit 14, the auxiliary storage unit 15, the communication unit 16, and the display unit 17 are connected to one another via a bus.

The processor 11 executes a program read out to the main storage unit 14 from the auxiliary storage unit 15, so that the information processing device 10 operates. The processor 11 executes a program to implement the threat measures information obtaining unit 101, the influence information obtaining unit 102, the requirements information obtaining unit 103, the threat list information obtaining unit 104, the threat information obtaining unit 105, the primary ranking unit 106, the technology set management unit 107, the final ranking unit 108, and the technology set output unit 109.

The processor 11 executes the program read out to the main storage unit 14 from the auxiliary storage unit 15. The processor 11 is a central processing unit (CPU), for example. The main storage unit 14 is a memory such as a read only memory (ROM) or a random access memory (RAM), for example. The auxiliary storage unit 15 is a hard disk drive (HDD), a solid state drive (SSD), or a memory card, for example.

The output unit 12 is an interface through which to output information indicating a result of processing by the information processing device 10. The output unit 12 is a port to which a display device such as an external display (not shown) is connected. The output unit 12 is, for example, a universal serial bus (USB) terminal or a high definition multimedia interface (HDMI) (registered trademark) terminal.

The display unit 17 displays display information such as information indicating a result of processing by the information processing device 10. The display unit 17 is a liquid crystal display, for example.

The input unit 13 is an interface with which to operate the information processing device 10. The user uses the input unit 13 to enter various types of information into the information processing device 10. The input unit 13 is, for example, a keyboard or a mouse. In a case where the computer is a smart device such as a smartphone or a tablet terminal, the display unit 12 and the input unit 13 are touch panels, for example. The communication unit 16 is an interface through which to communicate with an external device. The communication unit 16 is, for example, a network interface card (NIC).

A program that runs on the computer is recorded in a file in an installable or executable format on a computer readable storage medium such as a CD-ROM, a memory card, a CD-R, or a digital versatile disc (DVD), and is provided as a computer program product.

Another configuration is possible in which the program that runs on the computer is stored in a computer connected to a network such as the Internet and is provided after downloading via the network.

Another configuration is possible in which the program that runs on the computer is provided through a network such as the Internet instead of downloading. Another configuration is possible in which the program that runs on the computer is incorporated into a ROM in advance and provided.

The program that runs on the computer has a module configuration including a functional configuration that can be executed also by a program among the functional configuration (functional block) of the information processing device 10. As the actual hardware, the processor 11 reads out and executes the programs from the storage medium, so that each of the functional blocks is loaded onto the main storage unit 14. In other word, each of the functional blocks is generated in the main storage unit 14.

It is possible that a part or the whole of the functional blocks is implemented by hardware such as an integrated circuit (IC) instead of software. In a case where a plurality of processors is used to implement the individual functions, each of the processors may implement one of the functions or two or more thereof.

The computer for implementing the information processing device 10 may operate in any manner. For example, one computer may implement the information processing device 10. Further, the information processing device 10 may be operated as a cloud system of the network.

[Description of Processing in First Embodiment]

Figure 3:
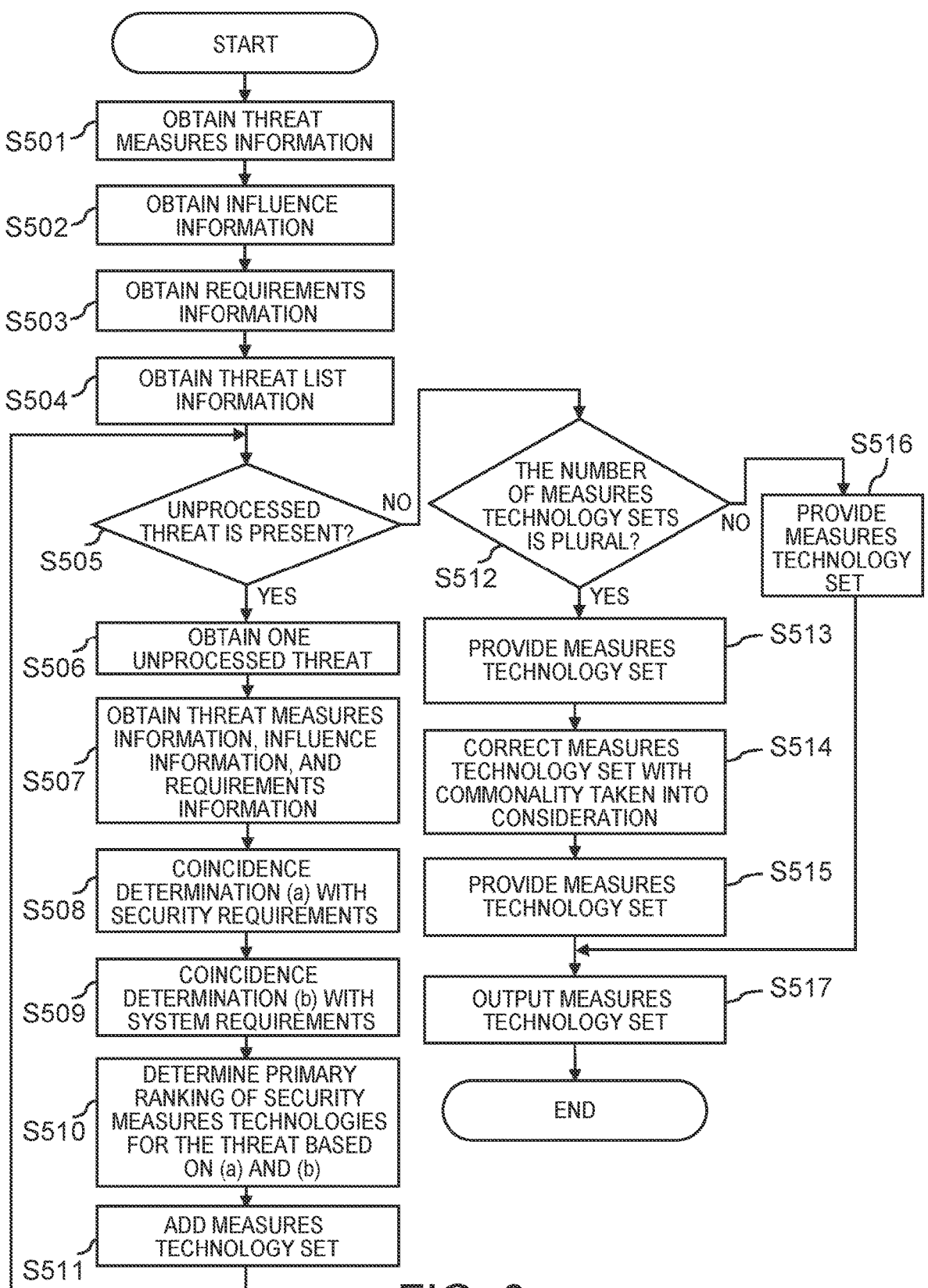
FIG. 3 is a flowchart depicting an example of processing executed by the information processing device according to the first embodiment.

FIG. 3 is a flowchart depicting an example of processing executed by the information processing device 10 according to the first embodiment.

Referring to FIG. 3, in the information processing device 10, first, the threat measures information obtaining unit 101 obtains threat measures information from the auxiliary storage unit 15 and so on (Step S501).

FIG. 4 shows an example of threat measures information managed by the threat measures information obtaining unit 101. The threats are, for example, "intrusion over network", "malware infection", and "tampering". The security measures technologies are countermeasures technologies effective against the threats.

FIG. 4 shows that the security measures technologies effective against the threat "intrusion over network" include "intrusion prevention system (IPS)", "intrusion detection system (IDS)", and "host-based fire wall (FW)".

It is also shown that the security measures technologies for the threat "malware infection" include "antivirus software" and "host-based FW". Here, the "host-based FW" is an FW installed on a host computer among FWs. As shown in FIG. 4, information indicating correspondence between the security measures technology and the security characteristics of the security measures technology may be added to the threat measures information.

Here, in the present specification, the security characteristics refer to general characteristics of the security measures technologies, such as functions of the security measures technologies (sometimes referred to as security functions simply), the strength of the security measures technologies, and ease of operation of the security measures technologies. The security characteristics are also information indicating the degree of satisfaction of the security requirements.

The security measures technologies can be classified into a technology such as "IPS" having a function to "prevent" an attack, a technology such as "IDS" having a function to "detect" an attack, and a technology such as "backup and recovery" having a function to "recover" from an abnormal state caused by an attack. The foregoing "prevention", "detection", and "recovery" are specific examples of the security functions. FIG. 4 shows information indicating the security functions as information indicating the security characteristics.

Referring to FIG. 3, in the information processing device 10, next, the influence information obtaining unit 102 obtains influence information from the auxiliary storage unit 15 and so on (Step S502).

FIG. 5 shows an example of the influence information managed by the influence information obtaining unit 102. Specific examples of the "influence on system" include "increase in communication delay", "inhibition of normal operation by over-detection", and "increase in computer load".

FIG. 5 shows, as an example, that the "IDS" has no particular "influence on system". FIG. 5 also shows that the "IPS" has an influence, as the "influence on system", on "increase in communication delay" and "inhibition of normal operation by over-detection". FIG. 5 further shows that the "host-based FW" has an influence on each of "increase in communication delay", "inhibition of normal operation by over-detection", and "increase in computer load".

Here, the presence or absence of "influence on system" is described. However, it is possible to describe the "influence on system" in a multi-step manner such as "no influence", "large influence", "medium influence", and "small influence". Further, in a case where the "influence on system" is quantified (for example, in a case where the amount of "increase in communication delay" is quantified), a specific value (X [ms], for example) may be described. It is noted that the "influence on system" is information indicating the degree of satisfaction of the system requirements. For example, in a case where there are requirements in which "increase in communication delay" is not acceptable as the system requirements, it is not desirable to introduce a security technology which involves "influence on system" because the system requirements cannot be satisfied.

Referring to FIG. 3, in the information processing device 10, the requirements information obtaining unit 103 obtains, through an input of the user, requirements information (Step S503). The requirements information includes information indicating the security requirements (security requirements information) and information indicating the system requirements (system requirements information). FIG. 6 shows an example of the requirements information obtained by the requirements information obtaining unit 103. As shown in FIG. 6, the requirements information is information indicating correspondence among "classification" indicating whether the requirements are the security requirements or the system requirements, "requirements item", and "requirements content".

FIG. 6 shows that the security requirements specify "security functions" as the "requirements item" and specify "prevention" as the "requirements content" corresponding to the "security functions". FIG. 6 also shows that the system requirements specify "increase in communication delay", "inhibition of normal operation by over-detection", and "increase in computer load" as the "requirements item" and specify "acceptable", "unacceptable", and "unacceptable" as the "requirements content" corresponding to these "requirements items" in the stated order.

FIG. 6 shows the presence or absence of the system requirements (unacceptable, acceptable) only. However, another method is possible in which according to the magnitude of demand of the system requirements (the magnitude of constraint) (strength), description is made by using "high demand (large constraint)", "medium demand (medium constraint)", "low demand (small constraint)", and "no demand (no constraint)", or, using an acceptable specific value (for example, in the case of a communication delay, acceptable for a value equal to or smaller than X [ms], and unacceptable for a value equal to or greater than X [ms]). Similarly, as for the security requirements, an item for inputting the magnitude (strength) of a demand of the security requirements may be provided, such as "high demand", "medium demand" and "low demand".

It is assumed that, in the first embodiment, the user recognizes and inputs the classification into the security requirements and the system requirements, and thereby the requirements information obtaining unit 103 obtains the requirements information. The requirements information obtaining unit 103 may classify "requirements item" (inputted by the user) into the security requirements or the system requirements by referring to an existing database in which the security requirements or the system requirements are managed in correlation with the "requirements item".

Referring to FIG. 3, the threat list information obtaining unit 104 further obtains, through an input of the user, threat list information in the target system, and manages the obtained threat list information, for example, in tabular form as shown in FIG. 7 and so on (Step S504).

The threat list is a list of threats in the target system such as a threat 1 "intrusion over network" and a threat 2 "malware infection". The threat list can be entered by utilizing results of general risk assessment methods and tools.

In FIG. 3, the threat information obtaining unit 105 further determines whether there is a threat that has not yet been processed in the threat list managed by the threat list information obtaining unit 104 (Step S505).

In a case where the threat list has such an unprocessed threat (Step S505: YES), the threat information obtaining unit 105 obtains, from the threat list, threat information indicating one unprocessed threat and sends the obtained threat information to the primary ranking unit 106, and the primary ranking unit 106 obtains the same (Step S506).

The primary ranking unit 106 obtains, from the threat measures information obtaining unit 101, threat measures information for the threat 1 (information indicating a security measures technology effective against the threat 1 and information indicating the security characteristics of the security measures technology). The primary ranking unit 106 obtains, from the influence information obtaining unit 102, influence information related to the security measures technology effective against the threat 1 (information indicating an influence on the system of the security measures technology effective against the threat 1). The primary ranking unit 106 obtains, from the requirements information obtaining unit 103, the security requirements information and the system requirements information on the target system (Step S507).

The primary ranking unit 106 ranks the security measures technologies effective against the threat 1 as the security measures technologies to be ranked. The threat measures information of FIG. 4 shows that the security measures technologies effective against the threat 1 "intrusion over network" have three types of "IDS", "IPS", and "host-based FW". The primary ranking unit 106 ranks these three types of security measures technologies.

In Step S508, the primary ranking unit 106 performs coincidence determination (a) with the security requirements for the threat 1. The coincidence determination (a) means obtaining the number A of unsatisfied security requirements and the total number C of security requirements assuming that a security measures technology for the threat is introduced into the target system.

As shown in the security requirements in the target system of FIG. 6, "prevention" is a requirement as the "security functions". Since there are no other security requirements, the total number of security requirements C is 1.

Referring to FIG. 4, the "security functions" of the "IDS" is "detection". Thus, the number A of unsatisfied security requirements of the "IDS" is 1. Since the "security functions" of the "IPS" and the "host-based FW" is "prevention" as shown in FIG. 4, the number A of unsatisfied security requirements of the "IPS" and the "host-based FW" is 0 (zero), respectively. The foregoing result is shown in FIG. 8.

In Step S509, the primary ranking unit 106 performs coincidence determination (b) with the system requirements. The coincidence determination (b) means obtaining the number B of unsatisfied system requirements and the total number D of system requirements for a case where a security measures technology for the threat is introduced into the target system.

As shown in FIG. 6, requirements acceptable as the system requirements is "increase in communication delay". On the other hand, as shown in FIG. 6, requirements unacceptable as the system requirements are two types of "inhibition of normal operation by over-detection" and "increase in computer load". As shown in FIG. 5, since the "IDS" does not influence on any of the foregoing unacceptable requirements as the system requirements, the number B of unsatisfied system requirements is 0 (zero). On the other hand, as shown in FIG. 5, since the "IPS" influences "inhibition of normal operation by over-detection, B is one (1). Since the "host-based FW" influences "inhibition of normal operation by over-detection" and "increase in computer load", B is two (2). The foregoing result is shown in FIG. 8.

The total number D of system requirements of the target system equals three (3) since there are three items of the "increase in communication delay", the "inhibition of normal operation by over-detection", and the "increase in computer load" as shown in FIG. 6.

In Step S510 of FIG. 3, the primary ranking unit 106 determines a primary ranking of the security measures technologies for the threat on the basis of the coincidence of the security requirements and the system requirements in Step S508 and Step S509.

As an example, a method is possible in which a score (Score) of the individual security measures technologies is calculated by defining as the following mathematical formula 1, and a ranking is performed in descending order of the value.

$$\text{Score} = A \times (-1/C) + B \times (-1/D) \qquad \text{(Formula 1)}$$

The foregoing content (FIG. 8) is applied to formula 1, so that scores of the individual security measures technologies are as follows.

"IDS": $\text{Score} = 1 \times (-1) + 0 \times (-1/3) = -1$

"IPS": $\text{Score} = 0 \times (-1) + 1 \times (-1/3) \approx -0.33$

"host-based FW": $\text{Score} = 0 \times (-1) + 2 \times (-1/3) \approx -0.66$

In this case, the order of the scores is the "IPS", the "host-based FW", and the "IDS". Therefore, as the primary ranking of the security measures technologies for the threat 1 "intrusion over network", the "IPS" takes the first place (recommended measures technology), the "host-based FW" takes the second place, and the "IDS" takes the third place.

Referring to FIG. 3, the primary ranking unit 106 sends the obtained primary ranking result (measures technology set information) to the technology set management unit 107 (Step S511). The specific information sent to the technology set management unit 107 is, for example, the score or ranking of the individual security measures technologies used for determination of the ranking of the security measures technologies shown in FIGS. 8 and 9.

When the measures technology set, which has been subjected to the primary ranking for the threat 1, is completely sent, the processing returns to the determination of Step S505 in FIG. 3 again.

Since the threat 2 "malware infection" is unprocessed among the threats of the threat list in the target system, the processing proceeds to Step S506 (Step S505: YES). In Step S506, the threat information obtaining unit 105 obtains the threat 2 "malware infection".

The primary ranking unit 106 performs a primary ranking on the threat 2 "malware infection" by using the foregoing method. Thereby, as shown in FIG. 9, the "host-based FW" and the "antivirus software" have Score −0.66, and the "host-based FW" and the "antivirus software" both tie for the first place. Thus, for all the threats in the threat list, ranking of the security measures technologies manageable against the threats is performed.

Accordingly, the threat information obtaining unit 105 determines, in Step S505 of FIG. 3, that there is no unprocessed threat in the threat list, and the processing of the information processing device 10 proceeds to the determination of Step S512 (Step S505: NO).

In Step S512, the technology set management unit 107 determines whether the number of measures technology sets received is plural or not. In the case of this example, since there are two measures technology sets, the processing proceeds to Step S513 (Step S512: YES).

FIG. 10 is a diagram showing an example of a measures technology set managed by the technology set management unit 107. The technology set management unit 107 has a function, for example, to manage the measures technology set information in tabular form as shown in FIG. 10.

There are a plurality of threats in the target system in many cases, and the technology set management unit 107 has a function to manage a plurality of measures technology sets. If there are a plurality of measures technology sets, then the technology set management unit 107 provides the final ranking unit 108 with the plurality of measures technology sets (Step S513).

Referring to FIG. 3, the final ranking unit 108 performs a final ranking of the security measures technologies in such a manner that a security measures technology effective against a plurality of threats is given a high rank (Step S514). To be specific, the final ranking unit 108 has a function to correct the ranking result in such a manner that a security measures technology common to a plurality of measures technology sets in the target system is preferentially selected and to perform a final ranking.

The final ranking unit 108 corrects the score of formula 1, for example, for the security measures technology common to a plurality of measures technology sets. The score having subjected to the correction by the final ranking unit 108 is referred to as Score_new.

As a method for correcting the score, for example, as shown in formula 2 described later, a method is possible in which the number of identical security measures technologies observed within the top three among a plurality of measures technology sets is calculated (let F denote a value of the number) and a value obtained by multiplying F−1 by a constant (let K denote the constant) is added to Score.

Thereby, the final ranking unit 108 can move up the ranking of the security measures technology common to the plurality of measures technology sets regarding a plurality of threats.

$$\text{Score\_new} = \text{Score} + K \times (F-1) \qquad \text{(Formula 2)}$$

A specific example of the correction to the ranking by the final ranking unit 108 is described below. A case is provided below in which the measures technology set for a threat in the target system obtained by the final ranking unit 108 is the set as shown in FIG. 10.

Referring to the ranking of the security measures technologies for the threat 1 "intrusion over network" of FIG. 10, the "host-based FW" takes the second place. Further, in the ranking of the security measures technologies for the threat 2 "malware infection", the "host-based FW" takes the first place. In short, this shows that the "host-based FW" is a security measures technology effective against both threats of the threat 1 "intrusion over network" and the threat 2 "malware infection".

Since the "host-based FW" ranks in the top three of the security measures technologies for the two threats, F=2. Accordingly, as for the "host-based FW", K×1 is added to the Score. For example, in the case of K=0.5, the score (Score_new) after the correction to the "host-based FW" is −0.16 for the threat 1 "intrusion over network" and the threat 2 "malware infection".

Therefore, as shown in FIG. 11, in the final ranking for both the threats of the threat 1 "intrusion over network" and the threat 2 "malware infection", the "host-based FW" takes the first place.

Referring to FIG. 3, in the information processing device 10, the final ranking unit 108 provides the technology set output unit 109 with a technology set (Step S515).

In this example, since the number of threats in the target system is plural, the number of measures technology sets is plural, and the determination in Step S512 is "YES". However, in a case where the number of threats is singular and the number of measures technology sets is singular, the processing proceeds to Step S516 (Step S512: NO). The technology set management unit 107 provides the technology set output unit 109 with the measures technology set (Step S516). In such a case, the result of primary ranking is the result of final ranking. After that, the processing proceeds to Step S517.

In Step S517, in the information processing device 10, the technology set output unit 109 outputs information indicating the final measures technology set, and the processing is finished. The measures technology set is presented to the user through display with the display unit 17. The display form of the display unit 17 may be a tabular form as shown in FIG. 11. Alternatively, illustrations of the security measures technology may be displayed at the introduction part of each of the security measures technologies in the network diagram of the target system.

Further, in a case where the information processing device 10 is not provided with the display unit 17, the technology set output unit 109 may output information indicating the final measures technology set to an external display unit of the information processing device 10, so that the external display unit may display the final measures technology set.

[Effects of First Embodiment]

The information processing device 10 according to the first embodiment is capable of precisely ranking security measures technologies to be ranked in light of at least the system requirements for the target system and presenting, to the user, a proper security measures technology to be introduced. For example, such a proper security measures technology is displayed on the display unit 17 of the information processing device 10 or on an external display unit of the information processing device 10, so that the proper security measures technology can be presented to the user.

Further, the information processing device 10 according to the first embodiment performs a ranking in such a manner that a security measures technology effective against a plurality of threats is preferentially given a high rank, which enables the user to perform security design in a manner to minimize the number of security measures technologies to be introduced.

Therefore, even in a system having various requirements, the information processing device 10 according to the first embodiment is capable of precisely ranking the security measures technologies to be ranked in light of at least the system requirements, so that the precision of the security design by the user can be improved. In addition, the implementation period and cost of the security design by the user can be reduced. In essence, the information processing device 10 according to the first embodiment can support the user in designing the security.

(First Modification)

It should be noted that the foregoing method for primary ranking by the primary ranking unit 106 is one example, and many other methods are also possible. Another example of the method for primary ranking by the primary ranking unit 106 is described below.

For example, in a case where the magnitude of the constraint on the system requirements in the requirements information and an influence of each of the security measures technologies on the system in the influence information are shown in a multi-step manner, instead of Step S509 of FIG. 3, the primary ranking unit 106 may use suitability information shown in FIG. 14 to determine suitability (Ek) for each of the system requirements k of the security measures technology. Furthermore, instead of Step S510 of FIG. 3, the primary ranking unit 106 may determine a score in the following formula 3 to perform a ranking. The suitability is a score corresponding to the magnitude of the constraint on the system requirements (magnitude of demand) and the magnitude of the influence of the security measures technologies to be ranked on the system. Information indicating the suitability is referred to as suitability information.

$$\text{Score} = A \times (-1/C) + \Sigma Ek(k=1, \ldots, D)/D \quad \text{(Formula 3)}$$

FIG. 12 shows an example of a case where the influence of the security measures technologies on the system is shown in a multi-step manner, such as "no influence", "small influence", "medium influence", and "large influence" in the influence information obtained by the influence information obtaining unit 102 in Step S502 of FIG. 3. FIG. 13 shows an example where the magnitude of a demand of the system requirements (the magnitude of constraint) obtained by the requirements information obtaining unit 103 in step S503 is shown in a multi-step manner, such as "no demand (no constraint)", "low demand (small constraint)", "medium demand (medium constraint)", and "high demand (large constraint)". FIG. 14 shows an example of the suitability information.

For example, in a case where the requirements content of the k-th (k=1, ..., D) system requirements is "high demand" and the influence of the security measures technology (related to the k-th system requirements) on the system is "medium", the suitability Ek is −0.8 as shown in FIG. 14.

The suitability Ek is obtained by the requirements information obtaining unit 103 in response to an input of the user, in advance, to the requirements information obtaining unit 103 in Step S503 of FIG. 3, for example, and the suitability Ek is sent to the primary ranking unit 106 together with the requirements information.

Here, as with the first embodiment, a case of the threat list of FIG. 7 is described. First, the threat information obtaining unit 105 obtains the threat 1 "intrusion over network", and the primary ranking unit 106 determines suitability Ek of the "host-based FW" in the security measures technology of the threat measures information.

Referring to FIG. 12, the "influence on system" of the "host-based FW" is "medium influence" for the "increase in communication delay", "large influence" for the "inhibition of normal operation by over-detection", and "medium influence" for the "increase in computer load". Further, referring to FIG. 13, as the system requirements, the "requirements item" includes the "increase in communication delay", the "inhibition of normal operation by over-detection", and the "increase in computer load", and the "requirements content" corresponding thereto is "no demand", "medium demand", and "large demand", respectively. It is noted, from FIG. 13, that the total number D of the system requirements is three.

Among the items of the system requirements, suitability between the "increase in communication delay" and the "host-based FW" is denoted by E1. Similarly, as for the "inhibition of normal operation by over-detection" and the "increase in computer load", suitability thereof is denoted by E2 and E3, respectively.

In such a case, as for E1, the influence of the security measures technology "host-based FW" on the system in FIG. 14 corresponds to "medium", and requirements content of the requirements item "increase in communication delay" in FIG. 13 corresponds to "no demand". Thus, E1 is 0 (zero). Similarly, E2 is −0.8 and E3 is −0.8.

Thus, the suitability is applied to formula 3 to determine Score as follows.

"Host-based FW": Score=0×(−1/1)+(0+(−0.8)+(−0.8)/3≈−0.53

Similarly, Score of the "IDS" and Score of the "IPS" are calculated as follows.

"IDS": Score=1×(−1/1)+(0+0+0)/3≈−1

"IPS": Score=0×(−1/1)+(0+(−0.2)+0)/3≈−0.066

As shown in FIG. 15, therefore, as for the primary ranking for the threat 1 "intrusion over network", the "IPS" takes the first place, the "host-based FW" takes the second place, and the "IDS" takes the third place.

In a case where the primary ranking unit 106 uses the foregoing method to perform a primary ranking for the threat 2 "malware infection", as shown in FIG. 16, Score of the "host-based FW" is Score≈−0.53, Score of the "antivirus software" is Score≈−0.2, and the "antivirus software" takes the first place and the "host-based FW" takes the second place.

In this example, the suitability is used for calculation in a case where the system requirements and the influence information are shown in a multi-step manner. However, suitability may be defined also in a case where the security requirements are shown in a multi-step manner (for example, "high demand", "medium demand", "low demand" "no demand", and so on) and the suitability may be used to calculate Score for ranking.

Another configuration is possible in which the primary ranking unit 106 first extracts, from the security measures technologies of the threat measures information, only security measures technologies satisfying the security requirements of the target system, and then a ranking is performed on the extracted security measures technologies in view of the system requirements.

Another configuration is possible in which, after the primary ranking unit 106 extracts the security measures technologies satisfying the security requirements, security measures technologies satisfying the system requirements for which a demand of the user is high, and then extracts, from the extracted security measures technologies, security measures technologies satisfying system requirements corresponding to a medium level.

(Second Modification)

In formula 1 and formula 3, sufficiency of the security requirements and the system requirements are calculated separately. However, a method of calculating them together as shown in formula 4 may be used.

$$\text{Score}=(A+B)\times(-1/(C+D)) \qquad \text{(Formula 4)}$$

In a case where emphasis is placed on satisfaction of the security requirements, a weight may be given to the security requirements, such as multiplying $A\times(-1/C)$ by a coefficient ("2" in the formula) as shown in formula 5.

$$\text{Score}=A\times(-1/C)\times2+B\times(-1/D) \qquad \text{(Formula 5)}$$

In a case where emphasis is placed on satisfaction of the system requirements, a weight may be given to the system requirements, such as multiplying $B\times(-1/D)$ by a coefficient ("3" in the formula) as shown in formula 6.

$$\text{Score}=A\times(-1/C)+B\times(-1/D)\times3 \qquad \text{(Formula 6)}$$

In addition to the method described above, it is also possible to use a method in which data labeled with the implemented security measures is collected using, as the input information, threat information, security requirements, and system requirements of the existing system, supervised machine learning is performed and a ranking is determined by using the model.

(Third Modification)

The description goes on to further functions of the method for final ranking by the final ranking unit 108. In the example of final ranking shown in FIG. 11, the "host-based FW" takes the first place in both of the threat 1 "intrusion over network" and the threat 2 "malware infection", and the "host-based FW" is a measures technology to be recommended.

However, only the method for final ranking by the final ranking unit 108 described in the first embodiment may not be sufficient for selecting an optimum security measures technology. For example, a case is described in which a measures technology set managed by the technology set management unit 107 is a result of ranking shown in FIG. 17. In such a case, by the final ranking by the final ranking unit 108 described in the first embodiment, the result of ranking shown in FIG. 17 becomes the result shown in FIG. 18. In formula 2, K=0.5.

Referring to FIG. 18, as the security measures technologies for the threat 1 "intrusion over network", the "IPS" takes the first place (measures technology to be recommended), and as the security measures technologies for the threat 2 "malware infection", the "host-based FW" takes the first place (measures technology to be recommended).

In such a case, the security measures technology different for a plurality of threats takes the first place (measures technology to be recommended).

As described in the first embodiment, the final ranking unit 108 performs a final ranking in such a manner that a security measures technology effective against a plurality of threats is given a high rank and takes the first place (measures technology to be recommended). However, in the foregoing example, two different security measures technologies for two different threats take the first place (measures technology to be recommended) respectively, and a security measures technology common to the two threats does not take the first place (measures technology to be recommended).

Further, as shown in FIG. 18, as for the threat 2 "malware infection", the "host-based FW" (the second place before correction), whose score before correction is lower than that of the "antivirus software" (the first place before correction), takes the first place (measures technology to be recommended). The security measures technology that is not optimal for both the security requirements and the system requirements may take the first place (measures technology to be recommended), which is not preferable in this respect, either.

As described above, in the measures technology set after correction by the final ranking unit 108, in a case where a security measures technology common to a plurality of threats does not take the first place (measures technology to be recommended) and a security measures technology whose score before correction is low (ranking of the measures technology set managed by the technology set management unit 107) takes the first place (measures technology to be recommended), the final ranking unit 108 determines the ranking before correction to be a final ranking and outputs the same to the technology set output unit 109.

Thereby, the final ranking unit 108 does not use the ranking which has been corrected and become inappropriate as compared with the ranking before correction, and uses the ranking before correction as the final ranking, which enables determination of the final ranking with high precision.

Second Embodiment

[Description of Outline and Configuration of Second Embodiment]

In the first embodiment, security measures technologies are ranked on the precondition that a security measures technology is introduced into the entire system of one target system.

Some target systems have a multi-stage system configuration including a plurality of sub systems. In the present specification, a sub system refers to a partial system of a target system including some of devices (sometimes referred to as a constituent device or constituent element) constituting the target system. For example, in a case where a control system is configured of a plurality of network systems such as a field network system, a control network system, and an information network system, the individual network systems correspond to the sub systems of the control system.

Further, the sub systems often have different security requirements and different system requirements. Thus, it is important for both the security aspect of the target system and the operational aspect of the system to design and introduce an appropriate security measures technology for each sub system.

An information processing device 20 according to the second embodiment is capable of ranking the security measures technologies for a target system configured of a plurality of sub systems in light of at least the system requirements for each sub system.

Further, in the information processing device 10 according to the first embodiment, it is assumed that, in the requirements information, a user inputs requirements content of the security requirements and requirements content of the system requirements of the target system. However, even if the user is aware of the requirements item, the requirements contents of the security requirements and the system requirements may not be determined. Therefore, it is desirable that the requirements contents of the security requirements and the system requirements are automatically extracted. The information processing device 20 is capable of creating the requirements contents of the security requirements and the system requirements on the basis of system configuration information of the target system.

Figure 19:
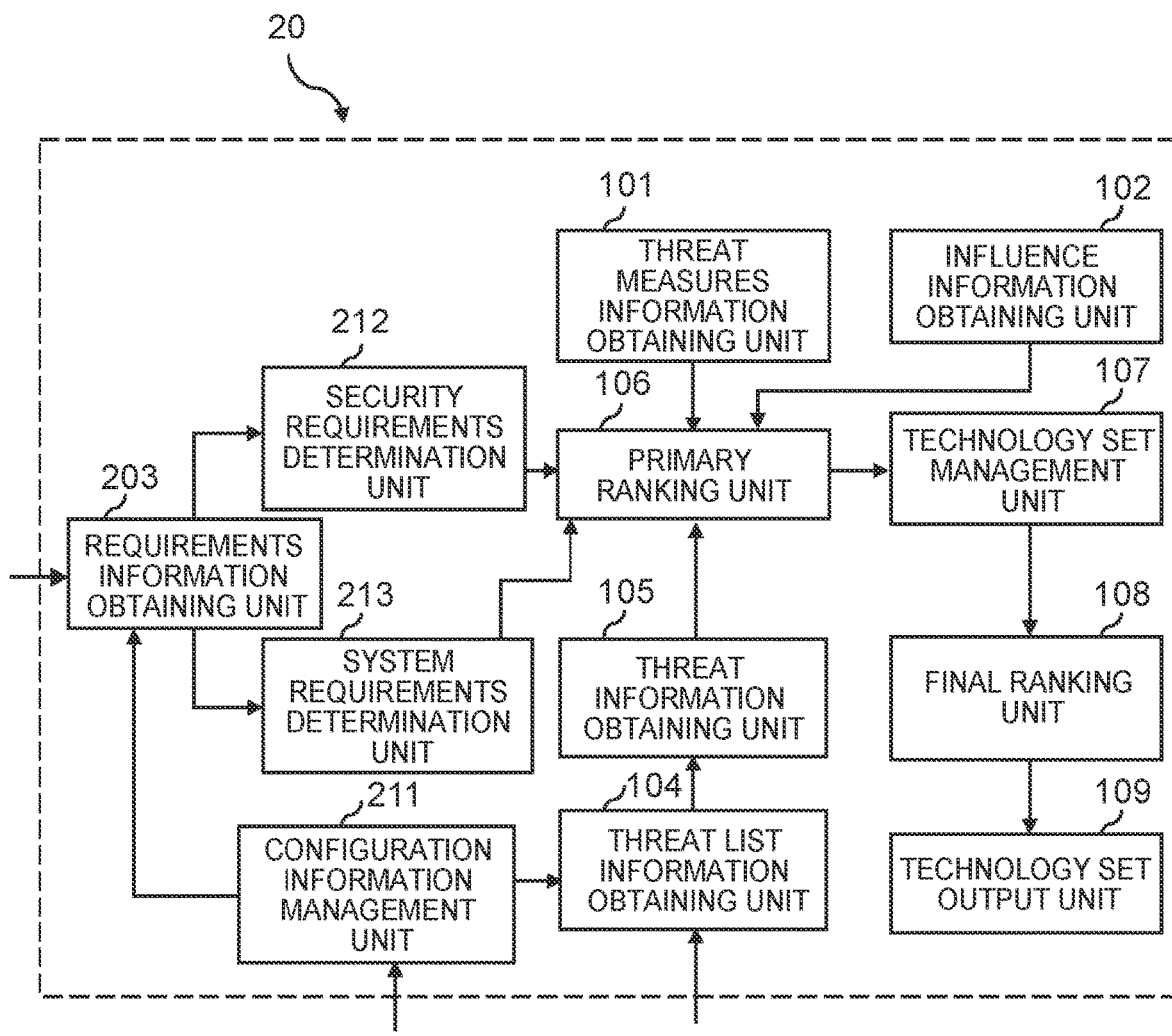
FIG. 19 is a functional block diagram showing an example of the functional configuration of an information processing device according to a second embodiment.

FIG. 19 is a functional block diagram showing an example of the information processing device 20. The information processing device 20 includes processing circuitry configured to operate as a configuration information management unit 211, processing circuitry configured to operate as a requirements information obtaining unit 203, processing circuitry configured to operate as a security requirements determination unit 212, and processing circuitry configured to operate as a system requirements determination unit 213. In FIG. 19, constituent elements similar to those of the first embodiment are denoted by the same reference numerals and the detailed description thereof is omitted. The hardware configuration of the information processing device 20 is similar to that of the information processing device 10 according to the first embodiment.

The configuration information management unit 211 obtains system configuration information of the target system through an input of the user, divides the target system into a plurality of sub systems on the basis of the system configuration information, and generates and manages the system configuration information of each of the sub systems. The constituent device of the target system is supposed to be classified into any sub system of the target system. Hereinafter, the system configuration information may be referred to as configuration information simply. In the present specification, the system configuration information is various information on a device included in the system, such as a name of the system (identifier), the name and identifier of the devices constituting the system, an IP address of the device, a connection relationship between devices, and a network diagram.

The information processing device 20 serves to perform ranking processing of security measures technologies for each sub system of a plurality of the sub systems.

The configuration information management unit 211 sends, to the requirements information obtaining unit 203, configuration information on one sub system of unprocessed sub systems. The configuration information management unit 211 also sends, to the threat list information obtaining unit 104, the configuration information on one sub system of the unprocessed sub systems.

The requirements information obtaining unit 203 obtains, from the configuration information management unit 211, the configuration information on one sub system of the unprocessed sub systems. The requirements information obtaining unit 203 obtains the requirements information on the sub system through an input of the user.

It is assumed that, in the requirements information obtaining unit 103 according to the first embodiment, the requirements content is fixed in the obtained requirements information. However, it is possible that, the requirements content of the requirements information obtained by the requirements information obtaining unit 203 according to the second embodiment is not fixed.

The security requirements determination unit 212 obtains, from the requirements information obtaining unit 203, the security requirements information on the sub system and the configuration information on the sub system, and generates the requirements content of the security requirements on the basis of the configuration information on the sub system. The details are provided below.

The system requirements determination unit 213 obtains, from the requirements information obtaining unit 203, the system requirements information on the sub system and the configuration information on the sub system, and generates the requirements content of the system requirements on the basis of the configuration information on the sub system. The details are provided below.

[Description of Processing in Second Embodiment]

Figure 21:
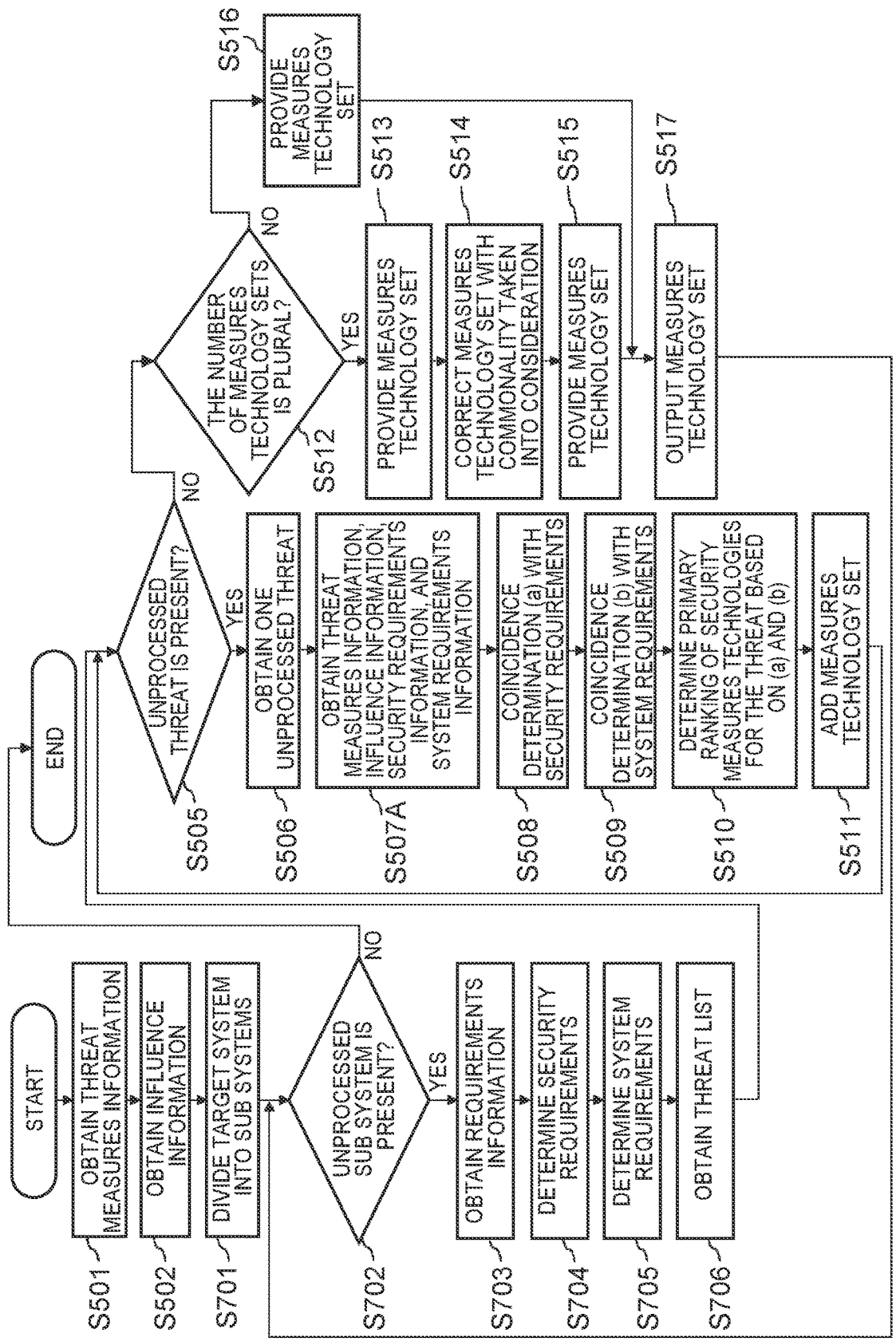
FIG. 21 is a flowchart depicting an example of processing executed by the information processing device according to the second embodiment.

The description goes on to the processing by the information processing device 20 according to the second embodiment in line with the flowchart of FIG. 21. In FIG. 21, description of Step S501, Step S502, Step S505, Step S506, and Step S508 to Step S517 is omitted because it is similar to that of the first embodiment.

In Step S701 of FIG. 21, first, the configuration information management unit 211 obtains configuration information on the target system through an input of the user. The configuration information management unit 211 further divides the target system into a plurality of sub systems on the basis of the obtained configuration information to generate configuration information on each of the sub systems.

Specifically, the configuration information management unit 211 recognizes some of the constituent devices of the target system as one sub system on the basis of the configuration information of the target system. The configuration information management unit 211 also classifies all the devices constituting the target system so as to belong to any of the sub systems.

As an example of the method for dividing the target system, it is possible to divide the target system including a plurality of networks by referring to tag information of VLAN as the configuration information on the target system. In a tag-based VLAN conforming to IEEE 802.1Q, ID information of the VLAN is added as a packet header. A method is possible in which the configuration information management unit 211 recognizes the ID information, regards IP addresses of packets having the same ID as the same network, and divides the target system with the same network regarded as a sub system.

As another example, a method is possible in which the configuration information management unit 211 recognizes whether the IP address of the constituent device of the target system is a private address or a global address, and divides the two networks of the Internet and the intranet as sub systems.

As another example, the target system may be divided for each network subnet with the network regarded as a sub system. For example, in a case where there are a network having a network address of 192.168.1.0/subnet mask 255.255.255.0 and a network having a network address of 192.168.0.0/subnet mask 255.255.255.0 in the target system, a method is possible for dividing the network into a network having a network address of 192.168.1.1 to 192.168.1.254 and a network having a network address of 192.168.0.1 to 192.168.0.254.

The sub systems may be divided according to the physical location of the constituent device of the target system, rather than the network. As an example, in a case where there are devices disposed on the cloud and devices disposed locally in the target system, among the devices of the target system, the configuration information management unit 211 collectively divides the devices disposed on the cloud into one sub system, and collectively divides the devices disposed locally into one sub system, on the basis of the arrangement information of the devices constituting the target system.

It is also possible to divide the target system by both the network configuration division and the physical location division.

Through the foregoing division method, in a case where the target system is a control system having a multi-stage network configuration including a field network, a control network, and an information network, for example, the configuration information management unit 211 divides each network of the control system as a sub system. To be specific, in the case of the control system of this example, the configuration information management unit 211 divides the target system into three sub systems of the field network, the control network, and the information network, generates configuration information on each sub system, and further manages the generated configuration information.

In Step S702 of FIG. 21, the configuration information management unit 211 determines whether or not there is an unprocessed sub system. Specifically, in a case where there is configuration information on a sub system that has not yet been sent to the requirements information obtaining unit 203 and the threat list information obtaining unit 104, among the configuration information on the sub systems managed by the configuration information management unit 211, the configuration information management unit 211 determines that there is an unprocessed sub system. In a case where the configuration information management unit 211 has already sent the configuration information on all of the sub systems of the target system to the requirements information obtaining unit 203 and the threat list information obtaining unit 104, the configuration information management unit 211 determines that processing has been completed on all of the sub systems.

If there is an unprocessed sub system (Step S702: YES), then the processing proceeds to Step S703. In Step S703, first, the requirements information obtaining unit 203 obtains, from the configuration information management unit 211, configuration information on one sub system of the unprocessed sub systems, and obtains requirements information relating to this sub system through an input of the user. In the same way, in Step S703, the requirements information obtaining unit 203 sends, to the security requirements determination unit 212, configuration information on the sub system and security requirements information on the sub system. Also in Step S703, the requirements information obtaining unit 203 sends, to the system requirements determination unit 213, the configuration information on the sub system and the system requirements information on the sub system.

In Step S704, the security requirements determination unit 212 determines requirements content of the security requirements of the sub system on the basis of the configuration information of the sub system. The security requirements determination unit 212 sends the security requirements information whose requirements content has been determined to the primary ranking unit 106.

For example, as shown in the requirements information of FIG. 20, in a case where the requirements content of "security functions" is not determined and "automatic determination" or the like is inputted, the security requirements determination unit 212 determines that it is necessary to determine the requirements content and determines the requirements content. As a method for determining the requirements content, for example, it is preferable to make a determination in accordance with a preset rule, for example, on the basis of connection information on a constituent device of the sub system. For example, if an important device is connected, then "prevention" is determined, and if a server device is connected, then "recovery" is determined.

As shown in the requirements information of FIG. 6, in a case where the requirements content of the security requirements information is determined in advance through an input of the user, it is preferable to send the security requirements information to the primary ranking unit 106.

In Step S705 of FIG. 21, the system requirements determination unit 213 determines the requirements content of the system requirements of the sub system on the basis of the configuration information on the sub system. For example, as shown in the requirements content of the "increase in communication delay" and the "increase in computer load" of the requirements information of FIG. 20, in a case where "automatic determination" or the like is inputted, the system requirements determination unit 213 determines that determination of the requirements content is necessary and determines the requirements content.

As a method for determining the requirements content, for example, it is preferable to make a determination in accordance with a preset rule, for example, on the basis of connection information on a constituent device of the sub system. For example, if a device in which an immediate response is required such as a distributed control system (DCS) is connected, then "increase in communication delay" is unacceptable, and if an office automation (OA) device is connected, then "increase in communication delay" and "inhibition of normal operation by over-detection" are acceptable.

Instead of the determination on the basis of the configuration information on the sub system, increase in a communication delay or a computer load, and packet discard due to over-detection are actually caused by an external tool, and, in light of the influence actually, the system requirements determination unit 213 may determine the requirements content of the system requirements, or alternatively, the user may judge the acceptability to determine the requirements content.

As shown in FIG. 20, "inhibition of normal operation by over-detection" is unacceptable. As in this case, if the requirements content of the system requirements information is determined in advance through an input of the user, it is preferable that the system requirements information is sent to the primary ranking unit 106.

In Step S706 of FIG. 21, threat list information on security in the sub system is obtained through an input of the user.

In the following flow, the processing performed on the target system in the first embodiment is performed on the sub system. As the processing in Step S505 and S506 is the same as those in the first embodiment, the description thereof is omitted.

In Step S507A, the primary ranking unit 106 obtains the security requirements information from the security requirements determination unit 212 and obtains the system requirements information from the system requirements determination unit 213, which is different from Step S507, in FIG. 3, of the processing flow of the information processing device 10 according to the first embodiment. The other points are similar to those of the first embodiment.

In Step S508 to Step S517, the information processing device 20 ranks the security measures technologies effective against a threat to the sub system to output a measures technology set. The description of Step S505 to Step S517 is omitted, because processing performed on the target system in the first embodiment is similarly performed on the subsystem.

The information processing device 20 ranks the security measures technologies effective against a threat to each of the sub systems of the target system until there are no remaining unprocessed sub systems in the target system.

Again, in Step S702, if there are no unprocessed sub systems (Step S702: NO), then the information processing device 20 finishes the processing.

[Effects of Second Embodiment]

The information processing device 20 according to the second embodiment is capable of dividing the target system into sub systems, and ranking security measures technologies to be ranked for each sub system. In general, the security requirements and the system requirements are different for each sub system in many cases. The information processing device 20 is capable of ranking the security measures technologies to be ranked with high precision in light of at least the system requirements for each sub system, and supporting the user in designing the security.

Further, the information processing device 20 according to the second embodiment determines the requirements contents of the security requirements and the system requirements on the basis of the configuration information on the sub system, even in a case where the requirements information obtained from the user does not include the requirements contents of the security requirements and the system requirements. Thus, even when the user cannot determine the requirements contents of the security requirements and the system requirements, it is possible to rank the security measures technologies to be ranked and support the user in designing the security.

Third Embodiment

[Description of Outline and Configuration of Third Embodiment]

In the third embodiment, constituent elements similar to those in the first embodiment are denoted by the same reference numerals as those in the first embodiment, and the detailed description thereof is omitted.

The description goes on to a remaining threat in the present specification. The remaining threat is a threat that remains in a target system or a threat that newly occurs in assets generated in the target system, in a case where a security measures technology is introduced to cope with a threat to the target system. In other words, the remaining threat is a threat remaining in the target system in the case of introducing a security measures technology effective against the threat into the target system.

As an example, it is assumed that a security measures technology to be introduced can cope with some (a part) of the threat, but cannot cope with some (another part) of the threat. In such a case, another part of the threat with which the security measures technology cannot cope is a remaining threat. As a specific example, it is assumed that the "host-based FW" is introduced as a security measures technology against the threat "malware infection" of the target system. In this case, the target system can reduce a risk of being infected with malware by downloading the malware from an unauthorized site via a network. However, the target system cannot reduce a risk of being infected with malware via an external medium such as a USB memory. Therefore, "malware infection via the external medium" is a remaining threat.

As another example, it is assumed that a threat to the target system can be dealt with by introduction of a security measures technology. In this case, the introduced security measures technology becomes a new asset in the target system, and an attack to invalidate this security measures technology is a remaining threat. As a specific example, it is assumed that the "host-based FW" is introduced as a security measures technology into the target system against the threat "malware infection". In this case, an attack to invalidate the host-based FW by an unauthorized change to settings of the PC is a remaining threat. In other words, "tampering with settings" is a remaining threat.

Figure 22:
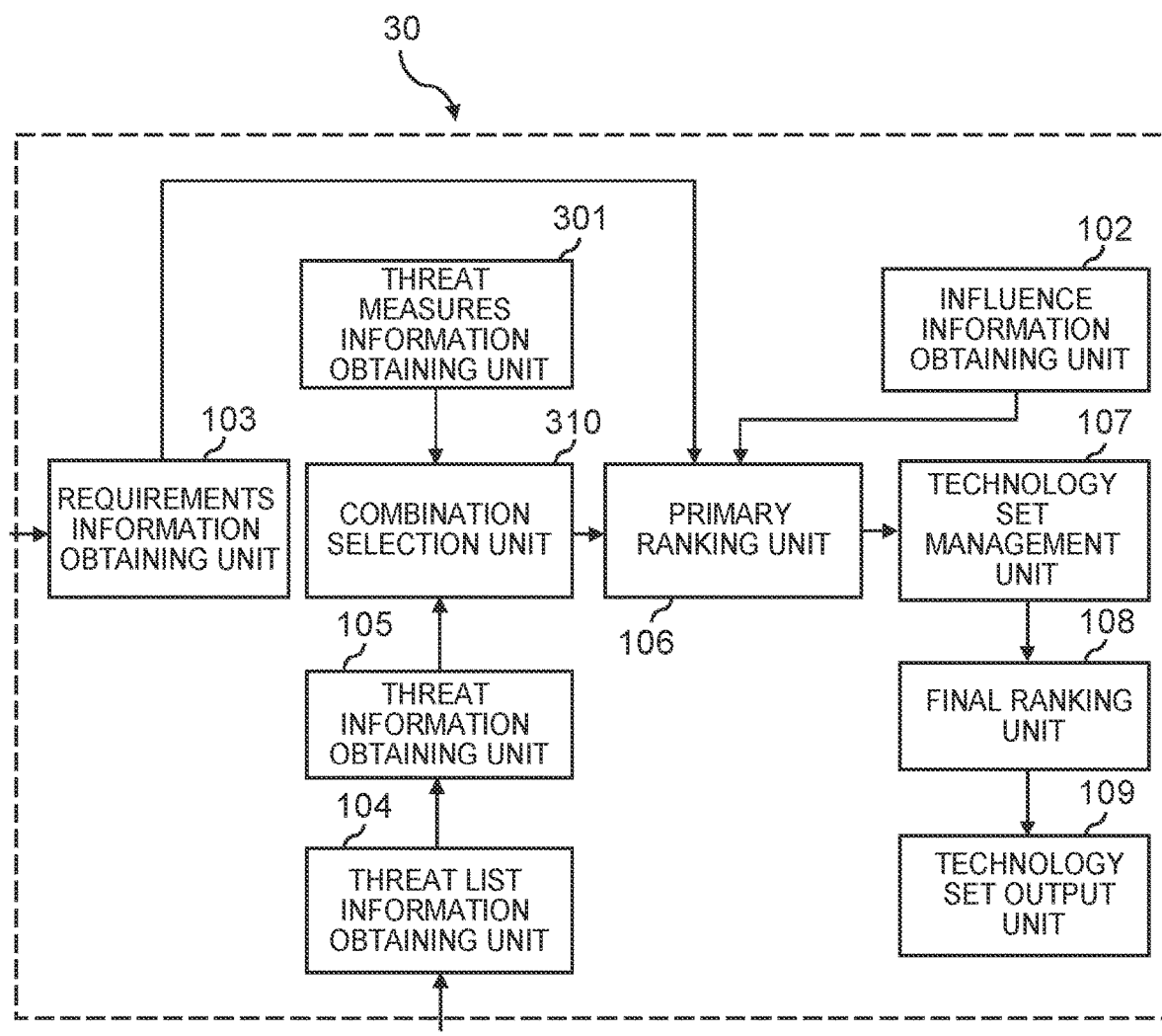
FIG. 22 is a functional block diagram showing an example of the functional configuration of an information processing device according to a third embodiment.

In order to take security measures against the foregoing remaining threat, as shown in FIG. 22, an information processing device 30 according to the third embodiment includes processing circuitry configured to operate as a threat measures information obtaining unit 301 and processing circuitry configured to operate as a combination selection unit 310. It is noted that the hardware configuration of the information processing device 30 is similar to that of the information processing device 10 according to the first embodiment.

The threat measures information obtaining unit 301 obtains, from the auxiliary storage unit 15, for example, threat measures information including information indicating a remaining threat, and manages the obtained information in tabular form as shown in FIG. 24. The threat measures information obtaining unit 301 sends the threat measures information to the combination selection unit 310.

The threat information obtaining unit 105 obtains, from the threat list information obtaining unit 104, one threat to the target system, and sends the threat information to the combination selection unit 310. The combination selection unit 310 selects a combination including one or two or more security measures technologies to eliminate the threat and the remaining threat shown in the obtained threat information (hereinafter, simply referred to as a combination of security measures technologies), and then generates information indicating a combination of the security measures technologies (hereinafter, referred to as combination information).

The combination selection unit 310 sends the combination information to the primary ranking unit 106. The primary ranking unit 106 ranks combinations of security measures technologies in light of at least the system requirements. The combination selection unit 310 is sometimes referred to as a combination generation unit 310.

[Description of Processing of Third Embodiment]

Figure 23:
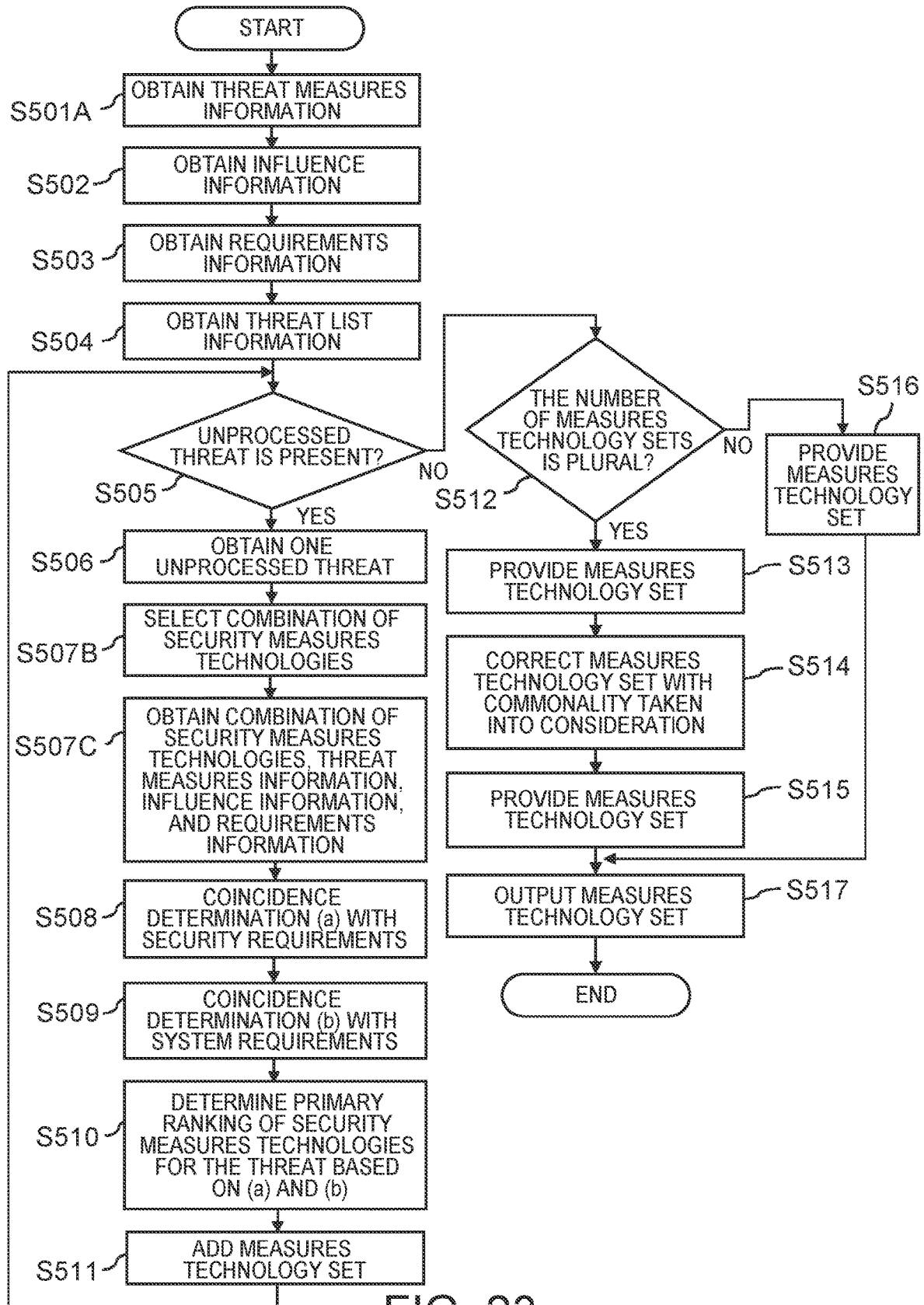
FIG. 23 is a flowchart depicting an example of processing executed by the information processing device according to the third embodiment.

The description goes on to processing executed by the information processing device 30 according to the third embodiment in line with a flowchart of FIG. 23. Referring to FIG. 23, in the information processing device 30, first, the threat measures information obtaining unit 301 obtains threat measures information from the auxiliary storage unit 15 and the like in Step S501A.

FIG. 24 shows an example of threat measures information managed by the threat measures information obtaining unit 301. The threat measures information shown in FIG. 24 includes information on a remaining threat in addition to a threat, a security measures technology, and a security function.

FIG. 24 shows that security measures technologies effective against the threat "malware infection" include the "host-based FW" and the "antivirus software". Of these, the remaining threats of the "host-based FW" are the remaining threat "malware infection via external media" and the remaining threat "tampering with settings".

Since Step S502 to Step S506 are similar to those in the first embodiment, the description thereof is omitted.

In Step S5073 of FIG. 23, the combination selection unit 310 selects a combination of security measures technologies. The description goes on to Rules 1, 2, and 3 of the processing by the combination selection unit 310 in Step S5073.

Rule 1: In a case where there is one remaining threat for one security measures technology, a security measures technology for eliminating the remaining threat is searched, and the security measures technology is added to a combination of security measures technologies that is effective against the threat and eliminates the remaining threat.

Rule 2: In a case where there are a plurality of remaining threats for one security measures technology, a combination of security measures technologies for eliminating the individual remaining threats is searched, and the searched combination of security measures technologies is added to the combination of security measures technologies that is effective against the threat and eliminates the remaining threat. In adding a combination of security measure technologies, in a case where the same security measures technologies overlap, the combination selection unit 310 adopts only one of the overlapping security measure technologies.

Rule 3: In a case where there is no remaining threat for one security measures technology (blank), searching is not performed for security measures technology for eliminating a remaining threat.

In the following description, as an example, it is assumed that the threat information obtaining unit 105 obtains the threat "malware infection" as the threat information in Step S506, transmits this threat information to the combination selection unit 310, and the combination selection unit 310 obtains this threat information.

Hereinafter, a method is described in which the combination selection unit 310 selects a combination of security measures technologies that is effective against the threat "malware infection" and has eliminated the remaining threat. As described above, a security measures technology effective against the threat "malware infection" includes two security measures technologies of "host-based FW" and "antivirus software".

At first, when the "host-based FW" is selected as a first combination, a remaining threat of the "host-based FW" is referred. That includes the threat: "malware infection via external media" (referred to as a threat A1) and the threat "tampering with settings" (referred to as a threat A2).

Thus, as the first combination, a security measures technology to be added to the "host-based FW" is selected in accordance with Rule 2. To be specific, a security measures technology that is effective against the threat A1 "malware infection via external media" can be selected from any one of "external media connection prohibited" and "antivirus software" as shown in FIG. 24. Therefore, the first combination is divided into the following two: a first A combination "host-based FW+external media connection prohibited+(security measures technology that is effective against tampering with settings (A2))", and a first B combination "host-based FW+antivirus software+(security measures technology that is effective against tampering with settings (A2))".

Referring to FIG. 24, a remaining threat of "external media connection prohibited" in the first A combination is "tampering with settings". Referring again to FIG. 24 on the basis of Rule 1, a security measures technology for eliminating the remaining threat "tampering with settings" is "administrative rights disabled", and a column of the remaining threat is blank and thus Rule 3 is applied.

Thus, the first A combination is "host-based FW+external media connection prohibited+administrative rights disabled+(security measures technology that is effective against tampering with settings (A2))". However, even referring to the security measures technology that is effective against "tampering with settings" (A2) of FIG. 24, "administrative rights disabled" is shown also. Therefore, finally, the first A combination can be "host-based FW+external media connection prohibited+administrative rights disabled" by eliminating the duplication.

Next, referring to FIG. 24, a remaining threat of "antivirus software" in the first B combination is "tampering with settings". Referring again to FIG. 24 on the basis of Rule 1, a security measures technology for eliminating the remaining threat "tampering with settings" is "administrative rights disabled", and a column of the remaining threat is blank and thus Rule 3 is applied. As described above, the first B combination is "host-based FW+antivirus software+administrative rights disabled+(security measures technology that is effective against tampering with settings (A2)". The duplication is removed ultimately, and the first B combination is "host-based FW+antivirus software+administrative rights disabled".

Next, among the security measures technologies effective against the threat "malware infection", a second combination including the second "antivirus software" is considered. Referring to FIG. 24, a remaining threat of "antivirus software" is "tampering with settings". Referring again to FIG. 24, a security measures technology effective against "tampering with settings" is "administrative rights disabled" and the remaining threat is blank. Therefore, the second combination is "antivirus software+administrative rights disabled".

As described above, as a combination of security measures technologies that is effective against the threat "malware infection" and eliminates a remaining threat, the following three combinations can be selected: the first A combination "host-based FW+external media connection prohibited+administrative rights disabled"; the first B combination "host FW+antivirus software+administrative rights disabled"; and the second combination "antivirus software+administrative rights disabled". Hereinafter, the first A combination, the first B combination, and the second combination are referred to as combination 1, combination 2, and combination 3, respectively. The three combinations obtained as described above are shown in FIG. 26.

Note that these combinations have information indicating that the combinations are effective against the threat "malware infection" and eliminate a remaining threat.

Further, each of the security measures technologies of each combination has information indicating which of threats the security measures technology is effective against. As one example, the security measures technology of the combination 1 is supposed to have information indicating that "host-based FW", "external media connection prohibited", and "administrative rights disabled" are effective against the threat "malware infection", the threat "malware infection via external media", and the threat "tampering with settings", respectively.

The combination selection unit 310 sends a combination of the selected security measures technologies to the primary ranking unit 106.

In Step S507C of FIG. 23, the primary ranking unit 106 obtains, from the combination selection unit 310, the combination (selected by the combination selection unit 310) and the threat measures information. In Step S507C also, the primary ranking unit 106 obtains the influence information from the influence information obtaining unit 102, and obtains the requirements information on the target system from the requirements information obtaining unit 103. In this example, it is supposed that the requirements information is information shown in FIG. 6.

In Step S508, the primary ranking unit 106 performs coincidence determination (a) with the security requirements for a combination of security measures technologies.

In a case where the coincidence determination (a) is performed on a combination of security measures technologies as in the present embodiment, the primary ranking unit 106 determines the number of unsatisfied security requirements of each of the security measures technologies in the combination, and calculates the sum of the number of unsatisfied security requirements of each of the security measures technologies as the number A of unsatisfied security requirements for the combination. Here, the definition of the coincidence determination (a) is the same as that of the first embodiment.

Further, in the present embodiment, the number of security requirements in the requirements information of the target system is multiplied with the number of security measures technologies in the combination. This multiplication result is the total number C of security requirements in the combination.

As shown in the security requirements in the target system of FIG. 6, "prevention" is a requirement content of the requirement item "security function". Since there are no other security requirements, the number of security requirements for the target system is one. The number of security measures technologies in the combination 1 is three, and the total number C of security requirements for the combination 1 is three. Similarly, the total number C of security requirements for the combination 2 is three, and the total number C of security requirements for the combination 3 is two.

The description goes on to steps of the processing of coincidence determination (a) for the combination 1 "host-based FW (effective against "malware infection")+external media connection prohibited (effective against "malware infection via external media")+administrative rights disabled (effective against "tampering with settings")".

Referring to FIG. 24, since a security function of "host-based FW" effective against the threat "malware infection" is "prevention", the number of unsatisfied security requirements is zero (0). Similarly, the number of unsatisfied security requirements of "external media connection prohibited" and "administrative rights disabled" is each zero (0). Therefore, the number A of unsatisfied security requirements for the combination 1 is a sum of the unsatisfied security requirements of each of the security requirements in the combination 1, and A=0.

A calculation method like the above is applied to the combination 2 and the combination 3, and the number A of unsatisfied security requirements is both 0. The results described above are shown in FIG. 26.

In Step S509, the primary ranking unit 106 performs coincidence determination (b) with the system requirements for a combination of security measures technologies.

As described in the present embodiment, in a case where the coincidence determination (b) is performed on a combination of security measures technologies, the primary ranking unit 106 determines the number of unsatisfied system requirements of each of the security measures technologies in the combination, and calculates a sum of the number of unsatisfied system requirements of each of the security measures technologies as the number B of unsatisfied system requirements for the combination. Here, the definition of the coincidence determination (b) is similar to that of the first embodiment.

Further, in the present embodiment, the number of system requirements in the requirements information of the target system is multiplied with the number of security measures technologies in the combination. This multiplication result is the total number D of system requirements for the combination.

The description goes on to the steps of coincidence determination (b) of the combination 1 "host-based FW+external media connection prohibited+administrative rights disabled".

Referring to FIG. 6, the system requirements in the target system are three of the "increase in communication delay", the "inhibition of normal operation by over-detection", and the "increase in computer load", and the number of security measures technologies in the combination is three. Therefore, the total number D of system requirements in the combination 1 is nine. Similarly, the total number D of system requirements in the combination 2 is nine, and the total number D of system requirements in the combination 3 is six.

As the system requirements, an acceptable requirements item is the "increase in communication delay" as shown in FIG. 6. On the other hand, unacceptable requirements items as the system requirements are two kinds of the "inhibition of normal operation by over-detection" and the "increase in computer load" as shown in FIG. 6.

Referring to influence information of FIG. 25, "host-based FW" influences both "inhibition of normal operation by over-detection" and "increase in computer load" which are unacceptable requirements items as the system requirements. Thus, the number of unsatisfied system requirements of "host-based FW" is two. Referring to FIG. 25, "external media connection prohibited" does not influence any of "inhibition of normal operation by over-detection" and "increase in computer load". Thus, the number of unsatisfied system requirements is zero (0). Referring to FIG. 25, "administrative rights disabled" does not influence any of "inhibition of normal operation by over-detection" and "increase in computer load". Thus, the number of unsatisfied system requirements is zero (0).

Therefore, the number B of unsatisfied system requirements in the combination 1 is a sum of unsatisfied system requirements of each of the security measures technologies in the combination 1, and B is two. Similar calculation is made for the combination 2 and the combination 3. Thereby, the number B of unsatisfied system requirements in the combination 2 is four. Further, the number B of unsatisfied system requirements in the combination 3 is two. The results described above are shown in FIG. 26.

In Step S510, the primary ranking unit 106 determines a primary ranking of security measures technologies for the threat on the basis of coincidence between the security requirements and the system requirements in Step S508 and Step S509.

As with the first embodiment, an example of a method is possible in which formula 1 is used to determine a score for each combination to rank in descending order of the score.

When the content (FIG. 26) as described above is applied to formula 1 described in the first embodiment, the scores of the security measures technologies are as follows.

Combination 1 "host-based FW+external media connection prohibited+administrative rights disabled": Score=$0 \times (-1/3) + 2 \times (-1/9) \approx -0.22$ Combination 2 "host-based FW+antivirus software+administrative rights disabled": Score=$0 \times (-1/3) + 4 \times (-1/9) = -0.44$ Combination 3 "antivirus software+administrative rights disabled": Score=0×(−½)+2×(−⅙)≈−0.33

Therefore, the combination 1 "host-based FW+external media connection prohibited+administrative rights disabled" takes the first place (measures technology to be recommended), the combination 3 "antivirus software administrative rights disabled" takes the second place, and the combination 2 "host-based FW+antivirus software+administrative rights disabled" takes the third place. The results described above are shown in FIG. 26.

Since Step S511 to Step S517 are similar to those of the first embodiment, the description thereof is omitted.

[Effects of Third Embodiment]

The information processing device 30 according to the third embodiment is capable of selecting a combination of security measures technologies that can eliminate a threat and a remaining threat to the target system. Further, the information processing device 30 is capable of ranking these combinations on the basis of at least the system requirements in the system requirements and the security requirements, and presenting the ranking to the user. As a result, the information processing device 30 is capable of precisely ranking combinations of security measures technologies that can eliminate a threat and a remaining threat to the target system, which can support the user in designing the security.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device for ranking one or more security measures technologies to be ranked, the information processing device comprising:
  processing circuitry configured to
    obtain influence information indicating a correspondence between each of the one or more security measures technologies and a corresponding influence strength on a system, for each influence item of at least one influence item, when each of the one or more security measures technologies is introduced into the system;
    obtain requirements information indicating system requirements of the system, which indicate a requirement strength for each influence item, of the at least one influence item, for the system; and
    rank the one or more security measures technologies based on a calculated degree of satisfaction of the system requirements indicated in the requirements information, the degree of satisfaction being calculated based on the obtained requirements information and the obtained influence information,
  wherein the influence strength on the system for each influence item includes an influence strength of inhibition of normal operation by over-detection, and
  the system requirements of the system include a requirement strength for inhibition of normal operation by over-detection.

2. The information processing device according to claim 1, wherein the one or more security measures technologies are manageable against a threat assumed in the system.

3. The information processing device according to claim 2, wherein the processing circuitry is further configured to:
  obtain threat information indicating the one threat;
  obtain threat measures information indicating a correspondence between the one threat and the one or more security measures technologies manageable against the one threat; and
  determine, in advance, the one or more security measures technologies based on the threat measures information and the threat information.

4. The information processing device according to claim 3, wherein the processing circuitry is further configured to:
  manage measures technology set information indicating a correspondence between the one threat and a ranking of the one or more security measures technologies; and
  output the measures technology set information.

5. The information processing device according to claim 3, wherein
  the threat measures information further includes information indicating a correspondence between the one or more security measures technologies and security characteristics of each of the one or more security measures technologies,
  the requirements information further includes security requirements of the system, and
  the processing circuitry is further configured to rank the one or more security measures technologies based on the degree of satisfaction of the system requirements and a degree of satisfaction of the security requirements, using the obtained requirements information, the obtained influence information, and the obtained threat measures information.

6. The information processing device according to claim 1, wherein the processing circuitry is further configured to calculate a first score related to the degree of satisfaction of the system requirements in the requirements information, rank the one or more security measures technologies based on the first score, and implement one of the ranked one or more security measures technologies.

7. The information processing device according to claim 4, wherein the processing circuitry is further configured to obtain threat list information indicating at least one threat assumed in the system, and obtain the threat information indicating the one threat from the threat list information.

8. The information processing device according to claim 7, wherein the threat list information includes a plurality of threats assumed in the system, and
  the processing circuitry is further configured to obtain the one threat from the threat list information, and rank the one or more security measures technologies manageable against the one threat.

9. The information processing device according to claim 8, wherein the processing circuitry is further configured to:
  obtain the one threat and another threat from the threat list information, and
  rank the one or more security measures technologies manageable against the another threat.

10. The information processing device according to claim 9, wherein the processing circuitry is further configured to manage,
  as first technology set information, technology set information indicating a correspondence between the one threat and a ranking of the one or more security measures technologies manageable against the one threat, and
  as second technology set information, technology set information indicating a correspondence between the another threat and the one or more security measures technologies manageable against the another threat.

11. The information processing device according to claim 10, wherein the processing circuitry is further configured to:
advance a rank of a same security measures technology when there is the same security measures technology in the first technology set information and the second technology set information.

12. The information processing device according to claim 11, wherein the processing is further configured to advance the rank of the same security measures technology when an original rank of the same security measures technology is ranked higher than a predetermined rank.

13. The information processing device according to claim 12, wherein the processing is further configured to not advance the rank of the same security measures technology, when an advanced rank of the same security measures technology is not the first rank in any of the first technology set information and the second technology set information, and when the original rank of the same security measures technology is lower than the predetermined rank.

14. An information processing device for ranking one or more security measures technologies to be ranked, the information processing device comprising:
processing circuitry configured to
obtain influence information indicating a correspondence between each of the one or more security measures technologies and a corresponding influence strength on a system, for each influence item of at least one influence item, when each of the one or more security measures technologies is introduced into the system;
obtain requirements information indicating system requirements of a sub system constituting the system, which indicate a requirement strength for each influence item, of the at least one influence item, for the system; and
rank the one or more security measures technologies based on a calculated degree of satisfaction of the system requirements indicated in the requirements information, the degree of satisfaction being calculated based on the obtained requirements information and the obtained influence information,
wherein the influence strength on the system for each influence item includes an influence strength of inhibition of normal operation by over-detection, and
the system requirements of the system include a requirement strength for inhibition of normal operation by over-detection.

15. The information processing device according to claim 14, wherein the processing circuitry is further configured to:
obtain configuration information of the system, and generate and manage configuration information of the sub system based on the obtained configuration information of the system.

16. The information processing device according to claim 15, the processing circuitry is further configured to:
determine a requirements content of the system requirements of the sub system based on the configuration information of the sub system, when the requirements content of the system requirements is not determined.

17. An information processing device for ranking combinations of security measures, each of the combinations including one or more security measures technologies, the information processing device comprising:
processing circuitry configured to
obtain influence information indicating a correspondence between each of the one or more security measures technologies and a corresponding influence strength on a system, for each influence item of at least one influence item, when each of the one or more security measures technologies is introduced into the system;
obtain requirements information indicating system requirements of the system, which indicate a requirement strength for each influence item, of the at least one influence item, for the system; and
rank the combinations based on a calculated degree of satisfaction of the system requirements indicated in the requirements information, the degree of satisfaction being calculated based on the obtained requirements information and the obtained influence information, for each of the one or more security measures technologies included in each of the combinations,
wherein the influence strength on the system for each influence item includes an influence strength of inhibition of normal operation by over-detection, and
the system requirements of the system include a requirement strength for inhibition of normal operation by over-detection.

18. The information processing device according to claim 17, wherein the processing circuitry is further configured to:
obtain threat information indicating at least one threat assumed in the system;
obtain threat measures information indicating correspondence between the at least one threat and security measures technologies manageable against the at least one threat; and
generate the combinations based on the threat information and the threat measures information.

19. The information processing device according to claim 18, wherein the threat measures information indicates a correspondence among the at least one threat, the security measures technologies manageable against the at least one threat, security characteristics of each of the security measures technologies, and a remaining threat of each of the security measures technologies.

20. A non-transitory computer-readable storage medium for causing a computer to perform operations for ranking one or more security measures technologies to be ranked, the operations comprising:
obtaining influence information indicating a correspondence between each of the one or more security measures technologies and a corresponding influence strength on a system, for each influence item of at least one influence item, when each of the one or more security measures technologies is introduced into the system;
obtaining requirements information indicating system requirements of the system, which indicate a requirement strength for each influence item, of the at least one influence item, for the system; and
ranking the one or more security measures technologies based on a calculated degree of satisfaction of the system requirements indicated in the requirements information, the degree of satisfaction being calculated based on the obtained requirements information and the obtained influence information,
wherein the influence strength on the system for each influence item includes an influence strength of inhibition of normal operation by over-detection, and the system requirements of the system include a requirement strength for inhibition of normal operation by over-detection.

\* \* \* \* \*